(12) United States Patent
Blumenau

(10) Patent No.: US 7,720,964 B2
(45) Date of Patent: *May 18, 2010

(54) CONTENT DISPLAY MONITOR

(75) Inventor: Trevor Blumenau, Milpitas, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/618,118

(22) Filed: Dec. 29, 2006

(65) Prior Publication Data

US 2007/0106788 A1    May 10, 2007

Related U.S. Application Data

(63) Continuation of application No. 09/490,495, filed on Jan. 25, 2000, now Pat. No. 7,386,473, which is a continuation of application No. 08/707,279, filed on Sep. 3, 1996, now Pat. No. 6,108,637.

(51) Int. Cl.
*G06F 15/173* (2006.01)

(52) U.S. Cl. .................................................... 709/224
(58) Field of Classification Search .............. 709/224, 709/225, 226
See application file for complete search history.

(56) References Cited

U.S. PATENT DOCUMENTS 3,540,003 A    11/1970    Murphy (Continued)

FOREIGN PATENT DOCUMENTS

EP    0228242 A2    7/1987

(Continued)

OTHER PUBLICATIONS

Transcript of videotaped deposition of Prakash Baskaran, Feb. 15, 2007, (277 pages).

(Continued)

*Primary Examiner*—Saleh Najjar
*Assistant Examiner*—Edward J Kim
(74) *Attorney, Agent, or Firm*—Hanley, Flight & Zimmerman

(57) ABSTRACT

The invention can enable monitoring of the display of content by a computer system. Moreover, the invention can enable monitoring of the displayed content to produce monitoring information from which conclusions may be deduced regarding the observation of the displayed content by an observer. The invention can also enable monitoring of the display at a content display site of content that is provided by a content provider site over a network to the content display site. Additionally, the invention can enable the expeditious provision of updated and/or tailored content over a network from a content provider site to a content display site so that the content provider's current and appropriately tailored content is always displayed at the content display site. Aspects of the invention related to transfer of content over a network are generally applicable to any type of network. However, it is contemplated that the invention can be particularly useful with a computer network, including private computer networks (e.g., America Online™) and public computer networks (e.g., the Internet). In particular, the invention can be advantageously used with computer networks or portions of computer networks over which video and/or audio content are transferred from one network site to another network site for observation, such as the World Wide Web portion of the Internet.

14 Claims, 7 Drawing Sheets

U.S. PATENT DOCUMENTS

| | | |
|---|---|---|
| 3,696,297 A | 10/1972 | Otero |
| 3,818,458 A | 6/1974 | Deese |
| 3,906,454 A | 9/1975 | Martin |
| 4,034,351 A | 7/1977 | Takezoe |
| 4,058,829 A | 11/1977 | Thompson |
| 4,084,262 A | 4/1978 | Lloyd et al. |
| 4,125,892 A | 11/1978 | Fukuda et al. |
| 4,166,290 A | 8/1979 | Furtman et al. |
| 4,236,209 A | 11/1980 | Lombardo, Jr. et al. |
| 4,283,709 A | 8/1981 | Lucero et al. |
| 4,315,330 A | 2/1982 | Brickman et al. |
| 4,355,372 A | 10/1982 | Johnson et al. |
| 4,356,545 A | 10/1982 | West |
| 4,473,824 A | 9/1984 | Claytor |
| 4,516,216 A | 5/1985 | Armstrong |
| 4,546,382 A * | 10/1985 | McKenna et al. .............. 725/14 |
| 4,566,030 A | 1/1986 | Nickerson et al. |
| 4,603,232 A | 7/1986 | Kurland et al. |
| 4,658,290 A | 4/1987 | McKenna et al. |
| 4,677,552 A | 6/1987 | Sibley, Jr. |
| 4,695,880 A | 9/1987 | Johnson et al. |
| 4,700,378 A | 10/1987 | Brown |
| 4,706,121 A | 11/1987 | Young |
| 4,713,791 A | 12/1987 | Saluski |
| 4,718,025 A | 1/1988 | Minor et al. |
| 4,725,886 A | 2/1988 | Galumbeck et al. |
| 4,740,912 A | 4/1988 | Whitaker |
| 4,745,559 A | 5/1988 | Willis et al. |
| 4,751,578 A | 6/1988 | Reiter et al. |
| 4,757,456 A | 7/1988 | Benghiat |
| 4,758,947 A | 7/1988 | Levendel et al. |
| 4,774,658 A | 9/1988 | Lewin |
| 4,783,648 A | 11/1988 | Homma et al. |
| 4,792,921 A | 12/1988 | Corwin |
| 4,817,080 A | 3/1989 | Soha |
| 4,823,290 A | 4/1989 | Fasack et al. |
| 4,827,508 A | 5/1989 | Shear |
| 4,831,582 A | 5/1989 | Miller et al. |
| 4,849,879 A | 7/1989 | Chinnaswamy et al. |
| 4,862,268 A | 8/1989 | Campbell et al. |
| 4,868,866 A | 9/1989 | Williams, Jr. |
| 4,887,308 A | 12/1989 | Dutton |
| 4,907,188 A | 3/1990 | Suzuki et al. |
| 4,912,466 A | 3/1990 | Call |
| 4,912,522 A | 3/1990 | Oates et al. |
| 4,924,488 A | 5/1990 | Kosich |
| 4,935,870 A | 6/1990 | Burk, Jr. et al. |
| 4,941,084 A | 7/1990 | Terada et al. |
| 4,954,699 A | 9/1990 | Coffey et al. |
| 4,954,969 A | 9/1990 | Tsumura |
| 4,958,284 A | 9/1990 | Bishop et al. |
| 4,961,132 A | 10/1990 | Uehara |
| 4,972,367 A | 11/1990 | Burke |
| 4,972,504 A | 11/1990 | Daniel, Jr. et al. |
| 4,977,455 A | 12/1990 | Young |
| 4,977,594 A | 12/1990 | Shear |
| 4,989,230 A | 1/1991 | Gillig et al. |
| 5,006,978 A | 4/1991 | Neches |
| 5,007,017 A | 4/1991 | Kobayashi |
| 5,008,929 A | 4/1991 | Olsen et al. |
| 5,019,963 A | 5/1991 | Alderson et al. |
| 5,023,907 A | 6/1991 | Johnson et al. |
| 5,023,929 A | 6/1991 | Call |
| 5,025,395 A | 6/1991 | Nose et al. |
| 5,032,979 A | 7/1991 | Hecht et al. |
| 5,036,518 A | 7/1991 | Tseung |
| 5,038,211 A | 8/1991 | Hallenbeck |
| 5,038,374 A | 8/1991 | Kaufman et al. |
| 5,042,027 A | 8/1991 | Takase et al. |
| 5,047,867 A | 9/1991 | Strubbe et al. |
| 5,049,873 A | 9/1991 | Robins et al. |
| 5,062,147 A | 10/1991 | Pickett et al. |
| 5,063,523 A | 11/1991 | Vrenjak |
| 5,063,610 A | 11/1991 | Alwadish |
| 5,088,108 A | 2/1992 | Uddenfeldt et al. |
| 5,101,402 A | 3/1992 | Chiu et al. |
| 5,109,350 A | 4/1992 | Henwood |
| 5,109,414 A * | 4/1992 | Harvey et al. ................ 725/135 |
| 5,140,419 A | 8/1992 | Galumbeck et al. |
| 5,146,591 A | 9/1992 | Bachman et al. |
| 5,150,116 A | 9/1992 | West |
| 5,155,857 A | 10/1992 | Kunisaki et al. |
| 5,159,685 A | 10/1992 | Kung |
| 5,161,109 A | 11/1992 | Keating et al. |
| 5,166,866 A | 11/1992 | Kim et al. |
| 5,181,113 A | 1/1993 | Chang |
| 5,201,048 A | 4/1993 | Coulter et al. |
| 5,202,985 A | 4/1993 | Goyal |
| 5,204,947 A | 4/1993 | Bernstein et al. |
| 5,208,588 A | 5/1993 | Nishiyama |
| 5,210,530 A | 5/1993 | Kammerer et al. |
| 5,212,684 A | 5/1993 | MacNamee et al. |
| 5,214,792 A | 5/1993 | Alwadish |
| 5,220,522 A | 6/1993 | Wilson |
| 5,220,655 A | 6/1993 | Tsutsui |
| 5,223,827 A | 6/1993 | Bell |
| 5,223,924 A | 6/1993 | Strubbe |
| 5,226,120 A | 7/1993 | Brown et al. |
| 5,231,593 A | 7/1993 | Notess |
| 5,235,680 A | 8/1993 | Bijnagte |
| 5,237,677 A | 8/1993 | Hirosawa et al. |
| 5,237,681 A | 8/1993 | Kagan et al. |
| 5,237,684 A | 8/1993 | Record et al. |
| 5,239,540 A | 8/1993 | Rovira et al. |
| 5,241,625 A | 8/1993 | Epard et al. |
| 5,241,671 A | 8/1993 | Reed et al. |
| 5,245,429 A | 9/1993 | Virginio et al. |
| 5,247,517 A | 9/1993 | Ross et al. |
| 5,247,575 A | 9/1993 | Sprague et al. |
| 5,247,697 A | 9/1993 | Ban |
| 5,249,260 A | 9/1993 | Nigawara et al. |
| 5,249,300 A | 9/1993 | Bachman et al. |
| 5,253,346 A | 10/1993 | Okabayashi et al. |
| 5,260,878 A | 11/1993 | Luppy |
| 5,261,091 A | 11/1993 | Yuyama |
| 5,262,860 A | 11/1993 | Fitzpatrick et al. |
| 5,267,314 A | 11/1993 | Stambler |
| 5,267,351 A | 11/1993 | Reber et al. |
| 5,276,458 A | 1/1994 | Sawdon |
| 5,276,789 A | 1/1994 | Besaw |
| 5,281,962 A | 1/1994 | Vanden Heuvel et al. |
| 5,283,639 A | 2/1994 | Esch et al. |
| 5,287,363 A | 2/1994 | Wolf et al. |
| 5,297,249 A | 3/1994 | Bernstein et al. |
| 5,301,287 A | 4/1994 | Herrell et al. |
| 5,301,350 A | 4/1994 | Rogan et al. |
| 5,309,243 A | 5/1994 | Tsai |
| 5,315,093 A | 5/1994 | Stewart |
| 5,315,580 A | 5/1994 | Phaal |
| 5,317,140 A | 5/1994 | Dunthorn |
| 5,321,831 A | 6/1994 | Hirose |
| 5,321,838 A | 6/1994 | Hensley et al. |
| 5,327,237 A | 7/1994 | Gerdes et al. |
| 5,327,554 A | 7/1994 | Palazzi et al. |
| 5,329,619 A | 7/1994 | Page et al. |
| 5,331,544 A | 7/1994 | Lu et al. |
| 5,333,302 A | 7/1994 | Hensley et al. |
| 5,339,239 A | 8/1994 | Manabe et al. |
| 5,339,409 A | 8/1994 | Sakuragi |
| 5,339,412 A | 8/1994 | Fueki |
| 5,339,433 A | 8/1994 | Frid-Nielsen |
| 5,347,632 A | 9/1994 | Filepp et al. |
| 5,349,662 A | 9/1994 | Johnson et al. |
| 5,351,278 A | 9/1994 | Koshishiba et al. |

| | | | | | | |
|---|---|---|---|---|---|---|
| 5,351,293 A | 9/1994 | Michener et al. | | 5,793,948 A | 8/1998 | Asahi et al. |
| 5,353,399 A | 10/1994 | Kuwamoto et al. | | 5,796,952 A | 8/1998 | Davis et al. |
| 5,355,327 A | 10/1994 | Stent | | 5,799,292 A | 8/1998 | Hekmatpour |
| 5,355,484 A | 10/1994 | Record et al. | | 5,819,156 A | 10/1998 | Belmont |
| 5,359,367 A | 10/1994 | Stockill | | 5,819,285 A | 10/1998 | Damico et al. |
| 5,361,359 A | 11/1994 | Tajalli et al. | | 5,823,879 A | 10/1998 | Goldberg et al. |
| 5,367,673 A | 11/1994 | Goldsmith et al. | | 5,828,375 A * | 10/1998 | Nomura et al. ............. 715/764 |
| 5,367,677 A | 11/1994 | Stanfill | | 5,829,001 A | 10/1998 | Li et al. |
| 5,371,846 A | 12/1994 | Bates | | 5,838,919 A | 11/1998 | Schwaller et al. |
| 5,374,951 A | 12/1994 | Welsh | | 5,848,396 A | 12/1998 | Gerace |
| 5,375,070 A | 12/1994 | Hershey et al. | | 5,870,546 A | 2/1999 | Kirsch |
| 5,375,237 A | 12/1994 | Tanaka et al. | | 5,878,384 A | 3/1999 | Johnson et al. |
| 5,379,380 A | 1/1995 | Mori et al. | | 5,918,014 A | 6/1999 | Robinson |
| 5,382,970 A * | 1/1995 | Kiefl ........................ 455/2.01 | | 5,931,912 A | 8/1999 | Wu et al. |
| 5,386,516 A | 1/1995 | Monahan et al. | | 5,933,811 A | 8/1999 | Angles et al. |
| 5,386,558 A | 1/1995 | Maudlin et al. | | 5,935,207 A | 8/1999 | Logue et al. |
| 5,388,211 A | 2/1995 | Hornbuckle | | 5,936,541 A | 8/1999 | Stambler |
| 5,388,252 A | 2/1995 | Dreste et al. | | 5,948,061 A | 9/1999 | Merriman et al. |
| 5,388,258 A | 2/1995 | Larsson et al. | | 5,951,643 A | 9/1999 | Shelton et al. |
| 5,390,281 A | 2/1995 | Luciw et al. | | 5,956,483 A | 9/1999 | Grate et al. |
| 5,398,336 A | 3/1995 | Tantry et al. | | 5,958,010 A | 9/1999 | Agarwal et al. |
| 5,406,269 A | 4/1995 | Baran | | 5,963,914 A | 10/1999 | Skinner et al. |
| 5,406,555 A | 4/1995 | Yoshida | | 5,964,839 A | 10/1999 | Johnson et al. |
| 5,408,607 A | 4/1995 | Nishikawa et al. | | 5,974,148 A | 10/1999 | Stambler |
| 5,410,598 A | 4/1995 | Shear | | 5,982,917 A | 11/1999 | Clarke et al. |
| 5,410,690 A | 4/1995 | Kawata | | 5,986,653 A | 11/1999 | Phathayakorn et al. |
| 5,412,778 A | 5/1995 | Andres | | 5,999,178 A | 12/1999 | Hwang et al. |
| 5,414,809 A | 5/1995 | Hogan et al. | | 6,014,638 A | 1/2000 | Burge et al. |
| 5,418,728 A | 5/1995 | Yada | | 6,018,619 A | 1/2000 | Allard et al. |
| 5,461,708 A | 10/1995 | Kahn | | 6,052,730 A | 4/2000 | Felciano et al. |
| 5,483,658 A | 1/1996 | Grube et al. | | 6,070,145 A | 5/2000 | Pinsley et al. |
| 5,485,897 A | 1/1996 | Matsumoto et al. | | 6,078,324 A | 6/2000 | Phathayakorn et al. |
| 5,491,820 A | 2/1996 | Belove et al. | | 6,108,637 A * | 8/2000 | Blumenau ...................... 705/7 |
| 5,499,340 A | 3/1996 | Barritz | | 6,112,238 A | 8/2000 | Boyd et al. |
| 5,521,617 A | 5/1996 | Imai et al. | | 6,112,240 A | 8/2000 | Pogue et al. |
| 5,524,073 A | 6/1996 | Stambler | | 6,115,608 A | 9/2000 | Duran et al. |
| 5,555,303 A | 9/1996 | Stambler | | 6,115,680 A | 9/2000 | Coffee et al. |
| 5,557,333 A | 9/1996 | Jungo et al. | | 6,138,155 A | 10/2000 | Davis et al. |
| 5,560,038 A | 9/1996 | Haddock | | 6,167,358 A | 12/2000 | Othmer et al. |
| 5,568,471 A | 10/1996 | Hershey et al. | | 6,173,311 B1 | 1/2001 | Hassett |
| 5,572,647 A | 11/1996 | Blades | | 6,180,030 B1 | 1/2001 | Hirai et al. |
| 5,590,056 A | 12/1996 | Barritz | | 6,182,097 B1 | 1/2001 | Hansen et al. |
| 5,594,911 A | 1/1997 | Cruz et al. | | 6,183,366 B1 | 2/2001 | Goldberg et al. |
| 5,604,867 A | 2/1997 | Harwood | | 6,189,030 B1 | 2/2001 | Kirsch et al. |
| 5,615,264 A | 3/1997 | Kazmierczak et al. | | 6,250,930 B1 | 6/2001 | Mintz |
| 5,623,652 A | 4/1997 | Vora et al. | | 6,264,560 B1 | 7/2001 | Goldberg et al. |
| 5,629,980 A * | 5/1997 | Stefik et al. .................... 705/54 | | 6,275,854 B1 | 8/2001 | Himmel et al. |
| 5,634,012 A * | 5/1997 | Stefik et al. .................... 705/39 | | 6,279,036 B1 | 8/2001 | Himmel et al. |
| 5,634,100 A | 5/1997 | Capps | | 6,279,112 B1 | 8/2001 | O'Toole, Jr. et al. |
| 5,638,443 A * | 6/1997 | Stefik et al. .................... 705/54 | | 6,317,787 B1 | 11/2001 | Boyd et al. |
| 5,646,998 A | 7/1997 | Stambler | | 6,324,546 B1 | 11/2001 | Ka et al. |
| 5,646,999 A * | 7/1997 | Saito ........................... 705/54 | | 6,360,261 B1 | 3/2002 | Boyd et al. |
| 5,648,965 A | 7/1997 | Thadani et al. | | 6,393,479 B1 | 5/2002 | Glommen et al. |
| 5,671,283 A | 9/1997 | Michener et al. | | 6,397,359 B1 | 5/2002 | Chandra et al. |
| 5,673,382 A | 9/1997 | Cannon et al. | | 6,408,335 B1 | 6/2002 | Schwaller et al. |
| 5,675,510 A | 10/1997 | Coffey et al. | | 6,418,470 B2 | 7/2002 | Blumenau |
| 5,682,525 A | 10/1997 | Bouve et al. | | 6,434,532 B2 | 8/2002 | Goldband et al. |
| 5,696,702 A | 12/1997 | Skinner et al. | | 6,449,604 B1 | 9/2002 | Hansen et al. |
| 5,706,502 A | 1/1998 | Foley et al. | | 6,466,970 B1 | 10/2002 | Lee et al. |
| 5,708,709 A * | 1/1998 | Rose ........................... 705/59 | | 6,569,095 B2 | 5/2003 | Eggers |
| 5,708,780 A | 1/1998 | Levergood et al. | | 6,601,100 B2 | 7/2003 | Lee et al. |
| 5,710,915 A | 1/1998 | McElhiney | | 6,609,239 B1 | 8/2003 | Xavier |
| 5,710,918 A | 1/1998 | Lagarde et al. | | 6,621,881 B2 | 9/2003 | Srinivasan |
| 5,712,979 A | 1/1998 | Graber et al. | | 6,625,648 B1 | 9/2003 | Schwaller et al. |
| 5,715,453 A | 2/1998 | Stewart | | 6,643,696 B2 | 11/2003 | Davis et al. |
| 5,717,860 A | 2/1998 | Graber et al. | | 6,662,195 B1 | 12/2003 | Langseth et al. |
| 5,717,923 A | 2/1998 | Dedrick | | 6,662,227 B2 | 12/2003 | Boyd et al. |
| 5,724,521 A | 3/1998 | Dedrick | | 6,671,715 B1 | 12/2003 | Langseth et al. |
| 5,732,218 A | 3/1998 | Bland et al. | | 6,712,702 B2 | 3/2004 | Goldberg et al. |
| 5,740,549 A | 4/1998 | Reilly et al. | | 6,714,921 B2 * | 3/2004 | Stefik et al. .................... 705/55 |
| 5,751,956 A | 5/1998 | Kirsch | | 6,719,660 B2 | 4/2004 | Palazzolo |
| 5,787,253 A | 7/1998 | McCreery et al. | | 6,753,280 B2 | 6/2004 | Seto et al. |
| 5,793,302 A | 8/1998 | Stambler | | 6,766,370 B2 | 7/2004 | Glommen et al. |

| | | | |
|---|---|---|---|
| 6,807,558 B1 | 10/2004 | Hassett et al. | |
| 6,826,565 B2 | 11/2004 | Ritchie et al. | |
| 6,859,833 B2 | 2/2005 | Kirsch et al. | |
| 7,017,143 B1 | 3/2006 | Andrew et al. | |
| 2002/0007418 A1 | 1/2002 | Hegde et al. | |
| 2002/0040394 A1 | 4/2002 | Shapira | |
| 2002/0040395 A1 | 4/2002 | Davis et al. | |
| 2002/0062223 A1 | 5/2002 | Waugh | |
| 2002/0077787 A1 | 6/2002 | Rappaport et al. | |
| 2002/0078191 A1 | 6/2002 | Lorenz | |
| 2002/0083188 A1 | 6/2002 | Hericy et al. | |
| 2002/0099812 A1 | 7/2002 | Davis et al. | |
| 2002/0099818 A1 | 7/2002 | Russell et al. | |
| 2002/0099819 A1 | 7/2002 | Hattori et al. | |
| 2002/0103664 A1 | 8/2002 | Olsson et al. | |
| 2002/0112048 A1 | 8/2002 | Gruyer et al. | |
| 2002/0120727 A1 | 8/2002 | Curley et al. | |
| 2002/0143933 A1 | 10/2002 | Hind et al. | |
| 2002/0147570 A1 | 10/2002 | Kraft et al. | |
| 2002/0156836 A1 | 10/2002 | Hanosik et al. | |
| 2002/0161673 A1 | 10/2002 | Lee et al. | |
| 2002/0174167 A1 | 11/2002 | Kitazawa et al. | |
| 2002/0184575 A1 | 12/2002 | Landan | |
| 2003/0023729 A1 | 1/2003 | Foster | |
| 2003/0033407 A1 | 2/2003 | Low | |
| 2003/0046303 A1 | 3/2003 | Chen et al. | |
| 2003/0046385 A1 | 3/2003 | Vincent | |
| 2003/0051026 A1 | 3/2003 | Carter et al. | |
| 2003/0062223 A1 | 4/2003 | Coyle et al. | |
| 2003/0065770 A1 | 4/2003 | Davis et al. | |
| 2003/0083994 A1 | 5/2003 | Ramachandran et al. | |
| 2003/0083995 A1 | 5/2003 | Ramachandran et al. | |
| 2003/0083998 A1 | 5/2003 | Ramachandran et al. | |
| 2003/0144868 A1 | 7/2003 | MacIntyre et al. | |
| 2003/0163563 A1 | 8/2003 | Bean | |
| 2003/0187677 A1 | 10/2003 | Malireddy et al. | |
| 2003/0208578 A1 | 11/2003 | Taraborelli et al. | |
| 2003/0231203 A1 | 12/2003 | Gallella | |
| 2004/0221033 A1 | 11/2004 | Davis et al. | |

FOREIGN PATENT DOCUMENTS

| | | | |
|---|---|---|---|
| EP | 0228242 A3 | | 7/1987 |
| EP | 0388658 | | 9/1990 |
| EP | 0228458 B1 | | 10/1991 |
| EP | 0451384 | | 10/1991 |
| EP | 0632382 | | 1/1995 |
| EP | 0747841 | | 12/1996 |
| EP | 0228458 B2 | | 10/1997 |
| GB | 2250112 A | * | 5/1992 |
| JP | 07200364 | | 8/1995 |
| JP | 8153022 | | 6/1996 |
| WO | WO 96/26529 | | 8/1996 |
| WO | WO 96/41495 | | 12/1996 |
| WO | WO 97/26729 | | 7/1997 |
| WO | WO 98/26529 | | 6/1998 |
| WO | WO 98/43380 | | 10/1998 |
| WO | WO0111506 A1 | | 2/2001 |

OTHER PUBLICATIONS

Transcript of videotaped deposition of Prakash Baskaran, Feb. 16, 2007, (122 pages).
Exhibit 5 of Baskaran deposition, HTML page embedding trace applet, Apr. 22, 1996 (8 pages).
Exhibit 6 of Baskaran desposition, resume of Prakash Baskaran, no date, (6 pages).
Exhibit 7 of Baskaran deposition, HTML page embedding trace applet, Jan. 1996, (4 pages).
Exhibit 9 of Baskaran deposition, HTML page embedding trace applet, no date, (3 pages).
Exhibit 10 of Baskaran deposition, log file, dated Feb. 28, 1996, (2 pages).
Exhibit 11 of Baskaran deposition, log file for web server, Oct. 28, 1995, (3 pages).
Exhibit 12 of Baskaran deposition, message posted on Gamelan web server, May 14, 1996, (3 pages).
Exhibit 13 of Baskaran deposition, PERL script of trace.pl program, Jan. 1996, (2 pages).
Exhibit 15 of Baskaran deposition, e-mail archive, Nov. 26, 1996, (52 pages).
Exbibit 16 of Baskaran deposition, stat.pl program, Jan. 1996, (3 pages).
Exhbit 17 of Baskaran deposition, production version of stat.pl, Jan. 1996, (5 pages).
Exhibit 19 of Baskaran deposition, PERL script wrote to collect information about someone interested in the trace applet, Mar./Apr. 1996, (4 pages).
Exhibit 20 of Baskaran deposition, HTML page embedding trace applet, Jan. 1996, (3 pages).
Exhibit 21 of Baskaran deposition, HTML homepage, Jan. 1996, (3 pages).
Exhibit 22 of Baskaran deposition, HTML page as part of Superlink website, Jan. 1996, (3 pages).
Exhibit 23 of Baskaran deposition, PERL script of trace program for web server on which trace applet was served, Feb. 1997, (2 pages).
Exhibit 24 of Baskaran deposition, shellscript which executes a program called Progman, no date, (2 pages).
Exhibit 25 of Baskaran deposition, PERL script from program developed while working for CMC, Nov. 14, 1995, (3 pages).
Exhibit 26 of Baskaran deposition, printout of a file listing of a folder identified as AT&T on the cd, date unknown earliest date appearing in the document is Aug. 5, 1994, (85 pages).
Exhibit 27 of Baskaran desposition, address list, no date (3 pages).
Exhibit 28 of Baskaran deposition, home page for trace applet, 1996, (2 pages).
Exhibit 31 of Baskaran depsoition, table of contents of tape archive, Jul. 14, 1995, (209 pages).
Exhibit 32 of Baskaran deposition, table of contents of att.tar.z file, Oct. 18, 1994, (59 pages).
Exhibit 33 of Baskaran deposition, table of contents of super_other. tar, Apr. 22, 1995, (4 pages).
Exhibit 34 of Baskaran deposition, trace.java source code, Jan. 5, 1996, (4 page).
Exhibit 35 of Baskaran deposition, trace.pl file content, Sep. 14, 1995, (2 pages).
Exhibit 36 of Baskaran deposition, stat.pl source code, Sep. 14, 1995, (6 pages).
Exhibit 37 of Baskaran deposition, stat.pl source code extracted from / PrakashB/log, Apr. 20, 1995, (3 pages).
Exhibit 38 of Baskaran deposition, stat.pl source code extracted from super_other.tar, Oct. 24, 1995, (6 pages).
Exhibit 39 of Baskaran deposition, trace.log source code, Sep. 14, 1995, (8 pages).
Exhibit 40 of Baskaran deposition, trace.html source code, Oct. 7, 1995, (2 pages).
Exhibit 41 of Baskaran deposition, header.html source code, Apr. 21, 1995, (2 pages).
Exhibit 42 of Baskaran deposition, projects.html source code, Dec. 5, 1995, (2 pages).
Exhibit 43 of Baskaran deposition, applets.html source code, Apr. 21, 1995, (3 pages).
Exhibit 44 of Baskaran deposition, titles.html source code, Dec. 5, 1995, (2 pages).
Exhibit 45 of Baskaran deposition, CGI-bin.html source code, Apr. 21, 1995, (2 pages).
Exhibit 46 of Baskaran deposition, RC_applet.html source code, Dec. 28, 1995, (2 pages).
Exhibit 47 of Baskaran deposition, java.html source code, Dec. 5, 1995, (2 pages).
Exhibit 48 of Baskaran deposition, index.html source code, Apr. 21, 1995, (3 pages).
Exhibit 49 of Baskaran deposition, faq html source code, Apr. 21, 1995, (2 pages).
Exhibit 50 of Baskaran deposition, movie.html source code, Apr. 21, 1995, (2 pages).

Exhibit 51 of Baskaran deposition, mov2.html source code, Apr. 24, 1995, (2 pages).
Exhibit 52 of Baskaran deposition, trace.pl proram extracted from super_other.tar, Oct. 12, 1995, (2 pages).
Exhibit 54 of Baskaran deposition, resume, Apr. 22, 1995, (4 pages).
Exhibit 55 of Baskaran deposition, gamelan.com website printout, Bates stamped U 0241562 and U-241563, May 14, 1996, (2 pages).
Exhibit 56 of Baskaran deposition, gamelan.com website printout, Bates stamped U0241555 through U0241561, May 1996, (7 pages).
Exhibit 57 of Baskaran deposition, order.pl file extracted from super_other.tar, Oct. 12, 1995, (4 pages).
Exhibit 58 of Baskaran deposition, collection of directories, Sep. 14, 1995, (51 pages).
Listing of Baskaran computer files (individual files are available from applicant on request), printed on Nov. 30, 2007, (99 pages).
Staten, James "Navigator Tricks Raise Concerns," MacWEEK, Mar. 18, 1996 (2 pages).
Hayes, Frank, "JavaScript Can Trace User Tracks," ComputerWorld, Mar. 18, 1996 (4 pages).
Burger, Dale, "JavaScript Escalates Privacy Fears," Computing Canada, Mar. 28, 1996, (2 pages).
McCarthy, Shawn P., "For Smooth Sailing, Try Out Alternative to Netscape Frames," Government Computer News, Oct. 21, 1996, (2 pages).
"Netscape in No Rush to Tell Users of JavaScript Security Flaw that Leaves them Users Wide Open to Attack," Computergram, Mar. 15, 1996, (2 pages).
Sullivan, Eamonn, "Internet Software Problems Drive Home Security Issue," PC Week, Mar. 11, 1996, (2 pages).
Taft, Darryl K. and Charlotte Dunlap, "Sun, Netscape Sing Different Tunes on the Net," Computer Reseller News, Mar. 25, 1996, (2 pages).
Tcpslice(8)—Linux man page retrieved from http://www.die.net/doc/linux/man/man8/tcpslice.8.html on Jun. 12, 2006, (3 pages).
Brueggeman, Peter "Monitoring CDrom Usage," Cambridge Scientifice Abstracts' Aquatic Sciences and Fisheries, no date, (5 pages).
Gamelan, the Official Director for Java, Tools and Utilities, web pages, retrieved from http://web.archive.org/web/19961026171839/www.gameland.com/pag . . . on Aug. 16, 2007, (31 pages).
Gamelan, the Official Director for Java, Network and Communications, web pages, retrieved from http://web.archive.org/web/19961026170151/www.gameland.com/pages . . . on Aug. 16, 2007, (7 pages).
Crazy Counter, last modified Mar. 8, 1996, (2 pages).
CrazyCounter Java applet, 1996, (5 pages).
Department of Engineering Measurement, Prof. Dr. rer. Nat. Wolf-Jurgen Becker, last modified on Sep. 20, 1996, (1 page).
Email from Paul Barber dated May 3, 1996, (2 pages).
Crazy Counter (GIF89a), last modified Mar. 8, 1996, (1 page).
Google Groups: comp.lang.javascript, dated Feb. 29, 1996, retrieved from http://groups-beta.google.com/group/comp.lang.javascript/browse_thread/thread/4874a9f9c . . . on Jun. 8, 2005, (4 pages).
Google Groups: comp.infosystems.www.providers, dated Dec. 7, 1994, retrieved from http://groups-beta.google.com/groups/comp.infosystems.www.providers/browse_thread/thre . . . on Jun. 8, 2005, (4 pages).
Email thread, dated Feb. 9, 1996, (33 pages).
Counter, trace applet code, author: java@mt.e-technik.uni-kassel.de, no date, (1 page).
Matt's Script Archive: Book 'em Dano: Readme, retrieved from file://P:\ Drive Files\CLIENTS\Nielsen-NetRatings\Settled Cases\Sane Solutions, LLC\. . . on Dec. 21, 2006, (2 pages).
Warren, Jim "Audience Tracking System" for Electronic Newspapers, Google Groups, May 3, 1995, (3 pages).
Index of pub/ftp/utilities/fwgstat, Software Archive, ftp.ist.utl.pt, 1999, (3 pages).
Fachgebiet MeBtechnik, Univ. -Prof Dr. rer. Nat. Wolf-Jurgen Becker, Uni Kassel, FB16, Messtechnik homepage, last modified Sep. 20, 1996, author: webmaster@mt.etechnik.uni-kassel.de, (1 page).
Franks, John "Looking for a GN log," Google Groups Beta, dated Oct. 7, 1993, retrieved from http://groups.google.com/group/comp.infosystems.gopher/browse_thread/thread/15dcl6c0284c02d0/953bf38f2ceel5ea?q=fwgstat&rnum=34 . . . on May 24, 2006, (3 pages).
Javascript Announcement.txt, made Dec. 4, 1995, (8 pages).
Carvdawg, "Java Project," Google Groups Beta, dated Jan. 18, 19997, retrieved from http://groups.google.com/group/comp.lang.java.programmer/browse_thread/thread/5430a3 . . . on Apr. 12, 2006, (3 pages).
"Java," javapage, retrieved from http://web.archive.org/web/20040712072256/http://www.groton.k12.ct.us/WWW/fsr/student/Spring02/W . . . on May 24, 2006, (4 pages).
IOMON—Protected mode I/O port monitor, program and source code, Jan. 1992, (6 pages).
Johnson, Aaron "Implementation Guide," HBX On-Demand Web Analytics, WebSideStory, Apr. 26, 2006, (15 pages).
"Horace's Java Page View Timer Demo," Form 1, last modified Aug. 7, 1999, (2 pages).
Sclauson, "Hit Counters," Google Groups Beta, dated Jun. 13, 1995, retrieved from http://groups.google.com/group/comp.infosystems.www.authoring.html/browse_thread/thread/dfbla837f29e165e/a0e6a131c6102d?q=acces . . . on May 24, 2006, (3 pages).
Mr. Matt, "Hit Counter," Google Groups Beta, dated Mar. 29, 1995, retrieved from http://groups.goodle.com/group/comp.infosystems.www.users/browse_thread/thread/390dc231bb3f0097/64bddc80086f124b?q+egi+hit+counte . . . on May 24, 2006, (2 pages).
"Hello Net" counter, no date, (1 page).
Ryan Hill, "Netscape 2.0 Javascript Security Concerns," Google Groups Beta, dated Mar. 1, 1996, retrieved from http://groups.google.com/group/comp.sys.mac.misc/browse_thread/thread/f9285c7d4e4354cd/eb94d50669840159?q+javascrip+exploit&rnum . . . on May 24, 2006, (3 pages).
Bob Jernigan, "Simple Event Counter," Google Groups Beta, dated Apr. 17, 1996, retrieved from http://groups.google.com/group/comp.databases.oracle/browse_thread/thread/97671e385d1bac94/777a82875e328555?q+javascript+counter+sc . . . on May 24, 2006, (2 pages).
Daniel Nichter, "Can U Make a Hit Counter in a Java Applet," Google Groups Beta, dated Jul. 21, 1996, retrieved from http://groups.google.com/group/comp.lang.java /browse_thread/thread/f2a41d0cb5c8eee4/c8 . . . on May 2, 2006, (6 pages).
Erik T. Mueller, "InfoTicker Java Applet," Google Groups Beta, dated May 11, 1996, retrieved from http://groups.google.com/group/comp.infosystems.www.announce /browse_thread/threadcc . . . on May 2, 2006, (2 pages).
Goldmail, "GoldMail thinks Consumers Should get Paid from Reading Advertising," Google Groups Beta, dated Jul. 7, 1996, (4 pages).
Goldmail, "GoldMail Revolutionizes Internet Advertising," Google Groups Beta, dated Jul. 7, 1996, (4 pages).
T. Berners-Lee, Uniform Resource Locators (Berners-Lee, Masinter).txt, dated Dec. 1994, (23 pages).
Daniel Jacobs, "WWW hit counter: does this work?," Google Groups Beta, dated Dec. 7, 1994, retrieved from http://groups.google.com/group/comp.infosystems.www.announce/browse_thread/thread/b4ef428d8c96d525/3e18b779b1dad79e?q=cgi+hit+counter&rnum=74& . . . on May 24, 2006, (7 pages).
Thomas Boutell, "WUSAGE 1.0: Server Usage Graphs, Top Ten . . . ," Google Groups Beta, dated Jan. 31, 1994, retrieved from http://groups.google.com/group/comp.infosystems/www/browse_thread/thread/a07834d8b38dbc4f/f05bfldf25d47fd3?q=wusage+1.0&rnum=1 . . . on May 24, 2006, (2 pages).
Lamers, Yermo, Webthreads Announcement.txt, Oct. 8, 1996, (7 pages).
"WebSideStory" dated Jun. 22, 2005, (10 pages).
"Web Authoring FAQ" retrieved from file://P:\P Drive Files\Clients\Nielsen-NetRatings\Settled Cases\Sane Solutions, LLC\. . . on Dec. 21, 2006, last updated Nov. 23, 2005, (59 pages).
Prentiss Riddle, "Single Program to Summarize Logs of Several Kinds of Server?" Google Groups Beta, dated Jan. 6, 1994, retrieved from http://groups.google.com/group/comp.infosystems.gopher/browse_thread/thread/4790232128a9157/ d1534978ddddf998?q=fwgstat&rnum=33 . . . on May 24, 2006, (10 pages).
Risks-Forum Digest "Forum on Risks to the Public in Computers and Related Systems," dated Mar. 4, 1996, vol. 17: Issue 83, retrieved from file://P;\P Drive Files\CLIENTS\Nielsen-NetRatings\Settled Cases\Sane Solutions, LLC\ . . . on Dec. 21, 2006, (11 pages).
R. Rieger, "SCO 3.2 UNIX," Google Groups Beta, dated Oct. 28, 1989, retrieved from http://groups.google.com/group.comp.unix/xenix/browse_thread/thread/cb3dlaed2lbc0e3e/8d9ce54693af9e98?q=xferstats&rnum=200 . . . on May 24, 2006, (3 pages).
Reuters, "Study Faults Online Ads for Kids, FTC Probes," Google Groups Beta, dated Mar. 28, 1996, (3 pages).
"Applets and Applikationen" Fachgebiet MeBtechnik, author: java@mt.e-technik.uni-kassel.de, last modified Aug. 27, 1996, (5 pages).
Hughes, Kevin, "Announce: Announcing getstats 1.0, a Web log analyzer," Google Groups Beta, dated Feb. 1, 1994, retrieved from http://groups.google.com/group/comp.infosystems.www/browsw_thread/thread/1009159de1aaf6aa/ed924b219923cc7d?q=getstates&rnum-1&rnum=1&h1 . . . on May 24, 2006, (3 pages).
Hughes, Kevin, "Announcing getsites 1.5, a Web log analyzer," Google Groups Beta, dated Nov. 3, 1993, retrieved from http://groups.google.com/group/comp.infosystems.www/browsw_thread/thread/a36eeb6daea735d8/0fa7adf53e51b894?q=getsites&rnum=19&h . . . on May 24, 2006, (2 pages).
Fielding, Roy T., "Announcing wwwstat-0.1—an access log summary program," Google Groups Beta, dated Jan. 15, 1994, retrieved from http://groups.google.com/group/comp.infosystems.www/browse_thread/thread/784aa9c20470d342/fc0cde0742990875?q=wwwstat&rnum=43 . . . on May 24, 2006, (8 pages).
"Applet Collection," author: Thomas Wendt, no date, (5 pages).
"Applets and Applications" Departmetn of Engineering Measurement, Applets at Kassel, author: java@mt.e-technik.uni-kassel.de, last modified Aug. 27, 1996, (5 pages).
Ivler, J.M. "Advertising Models and associated software," Google Groups Beta, dated May 15, 1996, (5 pages).
Desjardins, Louis "Activity Monitor 1.1" User's Guide, copyright 1994, (5 pages).
Carnahan, Jeffrey D. "Access Counters," Google Groups Beta, dated Jul. 3, 1995, retrieved from http://groups.google.com/group/comp.infosystems.www.authoring.html/browse_thread/thread/e515dad2e5d1e8cc/0ebdc329edec00cc?q=hit+c . . . on May 24, 2006, (7 pages).
"A Visual History of Web Measurement: Vendor Emergence, Technology Deployment and Seminal Events," assembled from document provided by John Pestana of Omniture, www.websitemeasurement.com, no date, (1 page).
"NetAcuity: IP Intelligence Whitepaper" Digital Envoy, copyright 2002-2003, (10 pages).
Guzdial, et al. "Analyzing and Visualizing Log Files: A Computationsal Science of Usability," GVU Center College of Computing, Georgia Institute of Technology, no date, (15 pages).
S. Glassman, "A Caching Relay for the World Wide Web," Selected papers of the first conference on WWW, Nov. 1994, Geneva, Switzerland, pp. 165-173.
A. Chankhunthod et al., "A Hierarchial Internet Object Cache," Proceedings of the 1996 USENIX Technical Conference, Jan. 1996.
A. N. Badre and P. Santos, "A Knowledge-Based System for Capturing Human-Computer Interaction Events: CHIME," Tech. Report GIT-GVU-91-21, Sep. 1991.
P. Sukaviriya, J. D. Foley, and T. Griffith, "A Second Generation User Interface Design Environment: The Model and the Runtime Architecture," Sep. 1992.
J. E. Pitkow and M. M. Recker, "A Simple Yet Robust Caching Algorithm Based on Dynamic Access Patterns," Proceedings of the 2nd International WWW Conference, 1994.
R. A. McGrath, "The Tail-Less Mouse," Computer Graphics World, vol. 11, 1988, pp. 117-118.

M. A. Abrams, "A Tool to Aid in Model Development and Validation," Proceedings of the 19th Annual Symposium on Simulation, 1986, Tampa, Florida, pp. 1-10.
J. K. Ousterhout et al., "A Trace-Driven Analysis of the UNIX 4.2 BSD File System," Proceedings of the Tenth ACM Symposium on Operating Systems Principles, Dec. 1985, Orcas Island, Washington, pp. 15-24.
D. M. Hilbert and D. F. Redmiles, "Agents for Collecting Application Usage Data Over the Internet," Proceedings of the Second International Conference on Autonomous Agents, May 10-13, 1998, Minneapolis, Minnesota, pp. 149-156.
B. McKenzie and A. Cockburn, "An Empirical Analysis of Web Page Revisitation," Proceedings of the 34th Annual Hawaii International Conference on System, vol. 5, Jan. 3-6, 2001, pp. 5019.
J. Finke, "Monitoring Usage of Workstations with a Relational Database," 1994 LISA—Sep. 19-23, 1994, pp. 149-158.
M. Guzdial, "Analyzing and Visualizing Log Files: A Computational Science of Usability," Tech. Report GIT-GVU, 1993.
A. Bestavros et al., "Application-Level Document Caching in the Internet," Proceedings of the 2nd International Workshop on Services in Distributed and Networked Environments, Jun. 5-8, 1995, pp. 166.
"Supporting Advertisement on Electronic Publications," IBM Technical Disclosure Bulletin, vol. 39, No. 8, Aug. 1, 1996, pp. 149-150.
T. J. Shepard, "TCP Packet Trace Analysis," Massachusetts Institute of Technology, Cambridge, Massachusetts, 1991.
T. Dellecave, "The Net Effect," Sale & Marketing Management, Mar. 1996, pp. 17-21.
S. McCanne and V. Jacobsen, "The BSD Packet Filter: A New Architecture for User-Level Packet Capture," Proceedings of the 1993 Winter USENIX Conference, Jan. 25-29, 1993.
M. J. Bates, "The Design of Browsing and Berry picking Techniques for the On-Line Search Interface," Online Review, vol. 13, No. 5, 1989, pp. 407-431.
V. Mayer-Schonberg, "The Internet and Privacy Legislation: Cookies for a Treat?," West Virginia Journal of Law and Technology, No. 1, 1997.
R. Gellman, "They Could be Monitoring your Every Web Move," Government Computer News, vol. 15, No. 9, Apr. 1996, pp. 25.
"The History of Internet Advertising," Direct Marketing News, Apr. 21, 1997, as re-printed on http://www.worldata.com/wdnet7/articles/the_history_of_Internet_Advertising.htm.
A. Lynnworth, "Tracking Home Page Hits—Reporting on User Access," Dr. Dobb's, 1995 from http://www.ddj.com/documents/s=979/ddj9517d/.
K. C. Claffy, G. C. Polyzos, and H.-W. Braun, "Traffic characteristics of the T1 NSFNET Backbone," Technical Report, University of California, San Diego, Jul. 1992.
L. Haran, "PC-Meter Tracks Computer Uses," Advertising Age, Oct. 2, 1995, pp. 36.
J. E. Tolle, "Performance Measurement and Evaluation of Online Information Systems," Proceedings of the 1985 ACM Thirteenth Annual Conference on Computer Science, Mar. 1985, New Orleans, Louisiana, pp. 196-203.
"Changes in NSF Policy Become Law—The Internet is Commercialized," from http://johnthomson.org/j561/NSFlaw-9.html on May 24, 2006.
"Criticism of the NSF Grows," from http://johnthomson.org/j561/NSFcriticism-6.html on May, 24, 2006.
"The NSF Starts to Change Their Policy," from http://johnthomson.org/j561/NSFpolicy-7.html on May 24, 2006.
"Creation of the NSFnet," from http://johnthomson.org/j561/NSFcreate-4.html on May 24, 2006.
"The Beginning of Commercialization of the NSFnet," from http://johnthomson.org/j561/NSFcomm-5 html on May 24, 2006.
P. H. Lewis, "Company News: Prodigy Testing Link to World Wide Web," The New York Times, Dec. 1, 1994.
S. A. Gile, "Reporting Application Usage in a LAN Environment," New Centerings in Computing Services, 1990, pp. 147-159.
J. E. Pitkow and M. M. Recker, "Results from the First World-Wide Web Survey," Special Issue of the Journal of Computer Networks and ISDN Systems, vol. 27, No. 2, 1994.

D. Dean and D. S. Wallach, "Security Flaws in the HotJava Web Browser," Technical Report 501-95, Department of Computer Science, Princeton University, Nov. 1995.

D. Anderson et al., "Next Generation Intrusion Detection Expert System (NIDES), Software Users Manual, Beta-Update Release," Tech. Report SRI-CSL-95-07, Computer Science Laboratory, SRI International, Dec. 1994.

P. Weiler and M. Hammontree, "Usability Lab Tools: One Year Later," Proceedings of the Conference on Human Factors in Computing System, Boston Massacusetts, 1994, pp. 330.

S. Greenberg, "Using Unix: Collected Traces of 168 Users," Research Report 88/333/45, Department of Computer Science, University of Calgary, Alberta.

S. Wu and C.-C. Liao, "Virtual Proxy Servers for WWW and Intelligent Agents on the Internet," Proceedings of the 30th Hawaii International Conference on System Sciences: Information Systems Track—Internet and the Digital Economy, Jan. 3-6, 1997, pp. 200.

G. Fleishman, "Web Log Analysis: Who's Doing What, When?—Part 2," 1998 from http://www.webdeveloper.com/categories/management/management_log_analysis.html.

R. Cooley, B. Mobasher, and J. Srivastava, "Web Mining: Information and Pattern Discovery on the World Wide Web," International Conference on Tools with Artificial Intelligence, Newport Beach, California, 1997, pp. 558-567.

M. Girdley et al., "Web Programming with JAVA," Jul. 1996.

J. C. Mogul, "WRL Report 90/5," Jul. 1990.

T. Berners-Lee et al., "World-Wide Web: The Informative Universe," Electronic Networking: Research, Applications and Policy, 1992.

G. McGraw et al., "Untangling the Woven Web: Testing Web-based Software," Apr. 1, 1996, pp. 1-8 from http://www.rstcorp.com.

T. J. Berners-Lee, "The ENQUIRE System Short Description," European Organization for Nuclear Research, Oct. 1980, pp. 7085-7099.

"Harris Computer Systems and Webster Network Strategies Announce Alliance to Offer WWW Monitoring Capabilities through Firewalls," Business Wire, Mar. 4, 1996.

R. Kraut et al., "HomeNet: A Field Trial of Residential Internet Services," HomeNet, pp. 1-8 from http://homenet.hcii.cs.cmu.edu/progress/report1.html.

J. E. Pitkow and N. Sukaviriya, "Identifying Patterns in Network-Based Resource Browser Usage," Tech. Report GIT-GVU.

A. Poler, "Improving WWW Marketing through User Information and Non-Intrusive Communications," Proccedings of the Second WWW Conference, 1994.

G. Marchionini, "Information-Seeking Strategies of Novices Using a Full-Text Electronic Encyclopedia," Journal of the American Society for Information Science, vol. 40, No. 1, 1989, pp. 54-66.

J. K. W. Lee et al., "Intelligent Agents for Matching Information Providers and Consumers on the World-Wide-Web," IEEE System Sciences, vol. 4, Jan. 1997, pp. 189-199.

J. E. Pitkow, "IRB Review: Mosaic Event Logging," Tech. Report GIT-GVU.

J. A. Bank, "Java Security," Dec. 8, 1995 from http://swissnet.ai.mit.edu/~jbank/javapaper/pavapaper.html.

R. M. Felciano and R.B. Altman, "Lamprey: Tracking Users on the World Wide Web," Proceedings of the 1996 AMIA Annual Fall Symposium, 1996, pp. 757-761.

R. Fuller and J. J. de Graff, "Measuring User Motivation from Server Log Files," Proceedings of the Second Conference on Human Factors & the Web, Redmond, Washington, 1996 from http://www.microsoft.com/usability/webconf/fuller/fuller.htm.

"A Little History of the World Wide Web," from http://www.w3.org/History.html on May 24, 2006 (6 pages).

M. Abrams et al., "Multimedia Traffic Analysis Using CHITRA95," Proceedings of the Third International Conference on Multimedia '95, Nov. 1995, pp. 267-276.

"An Early History of Lynx: Multidimensional Collaboration," from http://people.cc.ku.edu/~grobe/early-lynx.html on May 24, 2006 (8 pages).

J. F. Cove and B. C. Walsh, "Online Text Retrieval via Browsing," Information Processing and Management, vol. 24, No. 1, 1988, pp. 865-883.

M. Crovella and A. Bestavros, "Explaining World Wide Web Traffic Self-Similarity," Tech. Report TR-95-015, Boston University, Boston, Massachusetts, 1995.

H.-W. Braun, B. Chinoy, and K. C. Claffy, "Applied Network Research: 1994 Annual Status Report," University of California, San Diego, Apr. 19, 1995.

M. Bernstein et al., "Architectures for Volatile Hypertext," Proceedings of the Third Annual ACM Conference on Hypertext, Dec. 15-18, 1991, San Antonio, Texas, pp. 243-260.

G. Perlman, "Asynchronous Design/Evaluation Methods for Hypertext Technology Development," Proceedings of the Second Annual ACM Conference on Hypertext, Nov. 1989, Pittsburgh, Pennsylvania, pp. 61-81.

S. E. Hansen and E. T. Atkins, "Automated System Monitoring and Notification with Swatch," Proceedings of the 7th Systems Administration Conference, 1993.

P. J. Santos, A. N. Badre, "Automatic Chunk Detection in Human-Computer Interaction," Proceedings of the Workshop on Advanced Visual Interfaces, Jun. 1-4, 1994, Bari, Italy, pp. 69-77.

A. Johnson et al., "Automatic Touring in a Hypertext System," Twelfth Annual International Phoenix Conference on Computers and Communications, Mar. 23-26, 1993, pp. 524-530.

M. Bieber and J. Wan, "Backtracking in a Multiple-window Hypertext Environment," Proceedings of the European Conference on Hypermedia Technologies, 1994, pp. 158-166.

E. Caramel, S. Crawford, and H. Chen, "Browsing in Hypertext: A Cognitive Study," IEEE Transactions on Systems, Man and Cybernetics, vol. 22, No. 5, Sep.-Oct. 1992, pp. 865-883.

G. M. O'Connell, "A New Pitch—Advertising on the World Wide Web is a Whole New Ballgame," Modem Media—Bylined Articles, May 1995 from http://www.modemmedia.com.

J. Nardone, "The Modem Media Internet Reach and Involvement Scale (IRIS)," Modem Media—Bylined Articles, Feb. 1995.

J. Houston, "A Vision of Advertising Technology—How it Will Work and Why Advertisers Must Involve Themselves in the Process," Modem Media—Bylined Articles, Aug. 1994.

A. N. Badre and P. Santos, "CHIME: A Knowledge-Based Computer-Human Interaction Monitoring Engine," Tech. Report GIT-GVU-91-06, Jul. 1991.

J. Pitkow et al., "Using the Web as a Survey Tool: Results from the Second WWW User Survey," Submitted to the Third International WWW Conference GVU Technical Report: GVU-GIT-94-10, 12 pages.

"Demos," from http://www.w3.org/Conferences/JENC92/Demonstrations.html on May 24, 2006 (1 page).

"Counter," from http://web.archive.org/web/19970802020140/www.uni-kassel.de/fb16/ipm/mt/java/counteru.html on May 24, 2006 (1 page).

"Computers and Internet—Webpage Counters," from http://www.earthstation9.com/counters.htm on May 24, 2006 (2 pages).

"Computer Privacy Digest V8#024," from http://web.archive.org/web/200000829051834/itu.rdg.ac.uk/misc/Mailing_Lists/cpd/00000002.htm on May 24, 2006 (19 pages).

"Classic HTTP Documents," from http://www.w3.org/Protocols/Classic.html on May 24, 2006 (1 page).

D. Beckett, "Combined Log System," from http://www.igd.fhg.de/archive/1995_www95/papers/46/comblog.html on May 24, 2006 (8 pages).

"Windows Based Only Internet BBS Software—The Official BBS FAQ," from http://www.sysopworld.com/bbsfaq/ch02.2.4.htm on May 24, 2006 (23 pages).

"Change History of httpd," from http://www.w3.org/Daemon/Features.html on May 24, 2006 (15 pages).

"CGI: Common Gateway Interface," from http://www.w3.org/CGI/ on May 24, 2006 (2 pages).

"CERN Computer New Letter," from http://ref.web.cern.ch/ref/CERN/CNL/1991/204/ on May 24, 2006 (2 pages).

"Resonate: Solutions," from http://www.resonate.com/solutions.html/odf/CD_AN_Streaming.pdf on Dec. 29, 2006 (2 pages).

"Browser Timelines," from http://www.blooberry.com/indexdot/history/browsers6.htm on May 24, 2006 (3 pages).

"Opera," from http://www.blooberry.com/indexdot/history/opera.htm on May 24, 2006 (3 pages).

"Basic HTTP as Defined in 1992," from http://www.w3.org/Protocols/HTTP/HTTP2.html on May 24, 2006 (2 pages).
"tcpslice—Linnux Command—Unix Command," from http://linux.about.com/library/cmd/b1cmd18_tcpslice.htm on Jun. 12, 2006 (3 pages).
"First International Conference on the World-Wide Web," from http://www94.web.cern.ch/WWW94/ on May 24, 2006 (2 pages).
"Extended Log File Format," from http://www.w3.org/TR/WD-logfile.html on May 24, 2006 (6 pages).
"Gamelan Who's Who—Prakash Baskaran," from http://web.archive.org/web/19961027024909/www.gamelan.com/person.cgi?id=PB3 on Jun. 12, 2006 (1 page).
"Older Counter.html History," from http://www.ualberta.ca/Geo/Counter.History.html on May 24, 2006 (8 pages).
"New for Networks: NetAlarm 2.0 Network Monitoring," Newsbytes News Network, Aug. 6, 1991 (1 page).
"The Risks Digest," from http://catless.ncl.ac.uk/Risks/17.79.html on Dec. 11, 2005 (12 pages).
"Netscape History," from http://www.holgermetzger.de/Netscape_History.html on May 24, 2006 (4 pages).
S. Weston, "Netscape 2.0b2 Allows for Invasion of Privacy," from http://www.tbtf.com/resource/b2-privacy-bug.html on May 24, 2006 (2 pages).
"NCSA Mosaic History," from http://www.ncsa.uiuc.edu/News/MosaicHistory/ on Jun. 12, 2006 (15 pages).
"Mosaic Communications Changes Name to Netscape Communications Corporation," from http://www.holgermetzger.de/netscape/NetscapeCommunicationsNewsRelease.htm on May 24, 2006 (2 pages).
"Lynx Users Guide Version 2.3," from http://www.cse.unsw.edu.au/help/doc/lynx/lynx_help/Lynx_users_guide.html on Jun. 12, 2006 (12 pages).
"Logging Control in W3C httpd," from http://www.w3.org/Daemon/User/Config/Logging.html on May 24, 2006 (3 pages).
"Java World," from http://www.javaworld.com on Mar. 8, 1996.
"Java World," from http://www.javaworld.com on Apr. 1, 1996 (3 pages).
"Information Operations Timeline," from http://www.jfsc.ndu.edu/schools_programs/jciws/iw/io_timeline.asp on May 24, 2006 (9 pages).
T. Berners-Lee, "The Original Proposal of the WWW, HTMLized," from http://www.w3.org/History/1989/proposal.html on May 24, 2006 (14 pages).
"ibiblio—History," from http://www.ibiblio.org/history/ on May 24, 2006 (11 pages).
"HyperText Transfer Protocol Design Issues," from http://www.w3.org/Protocols/DesignIssues.html on May 24, 2006 (3 pages).
"Hot Java README and Link to the Software on SunSITE," from http://www.ibiblio.org/hotjava/ on May 24, 2006 (1 page).
"Gwstat v1.1 — Generate Graphs of httpd Server Traffic," from http://www.bubl.ac.uk///archive/internet/www/servers/gwstat6.htm on Jun. 12, 2006 (1 page).
"Access Counters in the Yahoo! Directory," from http://dir.yahoo.com/Computers_and_Internet/Internet/World_Wide_Web/Programming/Access_Counters/ on May 24, 2006 (3 pages).
"HTTPd Logfile Analysis Software," from http://ftp.ics.uci.edu/pub/websoft/wwwstat/ on Jun. 12, 2006 (18 pages).
"WWW Talk 1991 Archives," from http://ksi.cpsc.ucalgary.ca/archives/WWW-TALK/www-talk-1991.index.html on May 24, 2006 (1 page).
"WWW Homepage Access Counter and Clock!," from http://www.muquit.com/muquit/software/Count/Count.html on May 24, 2006 (32 pages).
T. Berners-Lee, "WorldWideWeb: Proposal for a HyperText Project," from http://www.w3.org/Proposal.html on May 24, 2006 (9 pages).
"WorldWideWeb for C5," from http://www.w3.org/Talks/C5_17_May_91.html on May 24, 2006 (1 page).
"World-Wide Web," from http://www.w3.org/Talks/OnlinePublishing93/Overview.html on May 24, 2006 (1 page).
"World Wide Web," from http://www.w3.org/History/19921103-hypertext/hypertext/WWW/TheProject.html on May 24, 2006 (1 page).

"W3 Project—Assorted Design Notes," from http://www.w3.org/History/1994/WWW/WorkingNotes/Overview.html on May 24, 2006 (2 pages).
"Welcome to Netscape!," from http://www.hnehosting.com/mirrors/Origin_of_a_Browser/mcom.10.1994/home/welcome.html on May 24, 2006 (2 pages).
"W3 Servers," from http://www.w3.org/History/19921103-hypertext/hypertext/DataSources/WWW/Servers.html on May 24, 2006 (2 pages).
"Google Groups: uutraf—UUCP Statistics for HoneyDanBer," from http://groups.google.com/group/alt.sources/browse_thread/thread/c9e60d434be3ad86/0a180fb213f27e2b?q=xferstats&rnum=199&hl=en on May 24, 2006 (10 pages).
"Using Norton pcANYWHERE for DOS—User's Guide," Symantec Corporation, 1994 (30 pages).
"Tradewinds—A Monthly Round-up of Internet Coverage in Trade and Industry Magazines," from http://members.verizon.net/~vze2vjb4/tw/tw2_5.txt on May 3, 2006 (11 pages).
"Screen Shots of Windows NT 3.1," from http://www.cs.umd.edu/hcil/muiseum/systems/winnt31src.html on Jun. 7, 2005 (4 pages).
"Product Lifecycle Dates—Windown Product Family," from http://support.microsoft.com/default.aspx?scid=fh;%5Bln%5D;LifeWin on Jun. 7, 2005 (5 pages).
"Plexus Log File Summaries," from http://ksi.cpsc.ucalgary.ca/archives/WWW-Talk/www-talk-1993q2.messages/563.html on May 24, 2006 (4 pages).
"Plenary at WWW Geneva 94," from http://www.w3.org/Talks/WWW94Tim/ on May 24, 2006 (4 pages).
"The Third International World-Wide Web Conference," from http://www.igd.fhg.de/archive/1995_www95/ on May 24, 2006 (1 page).
"The WorldWideWeb Browser," from http://www.w3.org/People/Berners-Lee/WorldWideWeb.html on May 24, 2006 (2 pages).
N. Spivak et al., "The Official Gamelan Java Directory," New York: Ziff-Davis Press, 1996.
"The Anonymizer Home Page," from http://web.archive.org/web/199990208003332rn_1/anonymizer.cs.cmu.edu:8080/ on May 24, 2006 (4 pages).
"tcptrace," from http://www.tcptrace.org on Jun. 12, 2006 (1 page).
"tcdump—Dump Traffic on a Network," from http://www.tcpdump.org/tcpdump_man.html on Jun. 12, 2006 (26 pages).
"Applets at Kassel (English)," from http://web.archive.org/web/19970802020436/http://www.uni-kassel.de/fb16/ipm/mt/java/javae.html on May 24, 2006 (5 pages).
"An Updated Quick Look at ViolaWWW," from http://www.w3.org/History/19921103-hypertext/hypertext/Viola/Review.html on May 24, 2006 (2 pages).
U.S. Appl. No. 10/864,071, filed Jun. 8, 2004, Davis.
U.S. Appl. No. 09/634,564, filed Aug. 9, 2000, Davis.
U.S. Appl. No. 09/553,776, filed Apr. 21, 2000, Srinivasan.
Catledge et al., *Characterizing Browsing Strategies in the World-Wide Web*, The Third International WWW Conference, 1995, 9 pages.
Cunha et al., *Characteristics of WWW Client-based Traces*, Boston University 1995, pp. 1-18.
Dow Jones & Company, *Start-Up NetCount Seeks to Tally How Many Web Surfers See Ads*, Oct. 11, 1996, 2 pages.
PR Newswire Association, Inc., *I/PRO Is First to Develop a Solution for Measuring Java Applets*, Apr. 12, 1996, 2 pages.
Dow Jones & Company, *New Software Helps Advertisers Get Through Tangled Web Pages*, Oct. 23, 1996, 2 pages.
Kamba, Tomonari, *Personalized Online Newspaper*, C&C Research Laboratories, Dec. 21, 2005.
Resonate, *Central Dispatch and Streaming Media*, http://www.resonate.com/solutions/pdf7CD_AN_Streamingpdf, pp. 1-5 (downloaded Jan. 2005).
RealNetworks, Inc., *RealServer™ Administration Guide Version 5.0*, http://docs.real.com/docs/internet50.pdf, Table of Contents, Ch. 6 (pp. 153-166), Ch. 9 (pp. 213-230) (downloaded Jan. 2005).
RealNetworks, Inc., *RealSystem 5.0 Security Features Whitepaper*, http://docs.real.com/docs/security.pdf, (10 pages) (downloaded Jan. 2005).

Progressive Networks, Inc., *RealServer Administration and Content Creation Guide Version 4.0*, http://docs.real.com/docs/pro40.pdf, Table of Contents, Introduction (pp. 7-21), pp. 91-94 (downloaded Jan. 2005).

Progressive Networks, Inc., *RealAudio Server Administration and Content Creation Guide Version 3.0*, http://docs.realcom/docs/server30.pdf, Table of Contents, pp. 97-106 (downloaded Jan. 2005).

Web Analytics: Making Business Sense of Online Behavior, pp. 48-57, 74-79, 86-87, 94-95, 106-109, 114-115, 126-127, 130-131, 146-149, (2002).

Peterson, Eric T., *Web Analytics Demystified*, (2004).

Lund, Terry, *Buyer's Guide to Web Analytics: Software to measure you Web site & landing pages*, (2004).

Coolware, Inc. *Conclusion*, http://www.coolware.com/4industry/0advertising/textonly/conclusion.html, (3 pages) (downloaded Oct. 22, 1997).

First Virtual Holdings Incorporated, *Statistics for VTAG-X*, http://www.vtag.com/sample_stats.html, (3 pages) (downloaded Oct. 22, 1997).

Narrative Communications Corporation, *Enliven Product Info*, http://www.narrative.com/products/20feat.htm, (3 pages) (downloaded Oct. 22, 1997).

*Synchro/resolver board supports six channels*, Electronic Engineering Times, n 637, 85, (Apr. 15, 1991).

*The Better to see you with—get your windows video up to speed with these graphic accelerators*, Windows Magazine, n 60, p. 260, (1995).

*WebTrends Essential Reporting for your Web Server*, Installation and User Guide, (Jan. 1996).

Interesé Corporation, *Feature set for Interesé market focus 3 developer's edition*, http://www.archive.org, (6 pages) (downloaded 1996).

Morgan Stanley, *The Internet Advertising Report*, http://www.ms.com, (1996).

Search Notes for "Links from the Mar. 1996 Issue of Internet World Magazine."

Angwin, Julia., Keeping Good Count of Web Ads, San Francisco Chronicle, San Francisco, Jul. 3, 1996, B.1, 4 pages.

Anonymous, Hearst Busys Interest in Web Measurement Film, Interactive Marketing News, Potomac, Jun. 7, 1996, p. 1, 3 pages.

Anonymous, How to Make you web ads pay off, Marketing Magazine, Toronto, Jun. 10, 2996, vol. 101, Issue 23, p. 15, 2pages.

Anonymous, I/PRO Revamps Web Measurement Products, Interactive Marketing News, Potomas, Mar. 1, 1996, 3 pages.

Anonymous, Web Measurement Services Help Track Traffic, PR News, Potomac, Mar. 18, 2001, 2 pages.

Bournellis, Cyntha, Tracking the Hits on Web Sites, Communications International, London, Sep. 1995, vol. 22, Issue 9, p. 22.

Cohen, Andy, Web Tracker, Sales and Marketing Management, New York, Nov. 1995, vol. 147, Issue 11, p. 123, 1 page.

Corcoran, Cate T., Two roads lead to new world of Internet development, InfoWorld, San Mateo: Apr. 29, 1996, vol. 18, Issue 18, p. 69.

Ebenkamp, Becky, On-Line Accountability, BrandWeek, New York, Jul. 22, 1006, vol. 37, Issue 30, p. 17.

McNaughton, Kora, Upside, The Intranet Takes Off, Foster City, Apr. 1996, vol. 8, Issue 4, p. 50, 14 pages, particularly 8 (Internet Profiles Corp., www.ipro.com), p. 10, Netcount, LLC at www.netcount.com.

Miller, Cyndee, Marketers demand real research results from cyber efforts, Marketing News, Chicago, Aug. 28, 1995, vol. 29, issue 18, 4 pages.

Pallab, Paul, Markeing on the Internet, Journal of Consumer Marketing, Santa Barbara, Aug. 1996, vol. 13, Issue 4, p. 27.

Phillips Media Groups, Audit Bureau Works to Develop Auditing Standards, Phillips Media Gropus Interactive Marketing News, Potomac, Nov. 2, 1995, p. 1.

Phillips Media Group, Research Firms Strive for Web Tracking that Counts. Phillips Media Gropus Interactive Marketing News, Potomac, Jun. 23, 1995.

Riphagen, J., Kanfer, A. In Search of the Elusive User, Gathering Information on Web Server Access, Oct. 14, 1996, NCSA, 14 pages.

Robertson, Niel, Stalking the Elusive Usage Data, Internet World, Apr. 1996, p. 28.

T.C. Doyle, Internet II—Beyond the Home Page—A plethora of new tools and languages marks the beginning of the second phase of Internet frenzy: application building VARbusiness, Manhasset: Mar. 1, 1996, p. 62.

Ury, Jill, Delahaye Group to Offer Net Bench, Business Wire, New York, May 31, 1995, sec.1, 3 pages.

Brown, *Using Netscape 2—Special Edition*.Que, $2^{nd}$ ed., pp. 247-248, 270-271, 617, 638-639, 720-721, 804-805, 834-835, 949 (1995).

*I/PRO is First to Develop a Solution for Measuring Java Applets*. I/PRO Website news release (Apr. 12, 1996).

Kamba et al., abstract re: *The Krakatoa Chronical* from NEC Tech.J., Japan, v49n7 (Jul. 1996).

Weber, New Software Helps Advertisers Get Through Tangled Web Pages. *Wall Street Journal* (Oct. 23, 1996).

Ziegler, NetCount Seeks to Tally Users of Web Ads. *Wall Street Journal* (Oct. 11, 1996).

Bharat et al., *Newscape—An Interactive, Personalized Online Newspaper*. (May 30, 1995).

*EPO Communication Pursuant to Article 96(2) EPC* from counterpart European application serial No. 97 940 719.4-2212. European Patent Office (Jan. 19, 2001).

Kamba, Tomonari et al., "the Krakatoa Chronicle—An Interactive, Personalized Newspaper on the Web," World Wide Web Journal: The Fourth International WWW Conference Proceedings, O'Reilly Associates, Inc., Dec. 11, 1995, pp. 159 to 170; XP-002147426.

International Search Report corresponding to International Application No. PCT/US1997/015353, mailed Jul. 16, 1998.

Brown, Using Netscape 2—Special Edition, QUE, $2^{nd}$ Edition, 1995.

Zeigler, Bart, "NetCount Seeks to Tally Users of Web Ads," Wall Street Journal, Oct. 11, 1996.

Deposition of John R. Lo Verso, "*NetRatings, Inc.* vs *Digital River, Inc., et al.*," United States District Court, District of Minnesota, Civil Action No. 06-3988, Apr. 23, 2008.

Translated abstract of Japanese Patent Publication No. JP8153022, published Jun. 11, 1996, retrieved from http://v3.espacenet.com/textdoc?DB=EPODOC&IDX=JP8153022&F=0& QPN=JP8153022 on Sep. 16, 2008, 1 page.

Is your site a success? Bayne, Kim M. American Demographics. Ithaca: Mar./Apr. 1996. p. 68, downloaded from ProQuest Direct on the Internet on Sep. 14, 2008, 7 pages.

Wells, Firms scrambling to measure users of on-line services; [Rockies Edition], Melanie Wells USA Today. Denver Post (pre-1997 Fulltext). Denver, Colo.: Nov. 27, 1995. p. E.02, downloaded from ProQuest Direct on the Internet on Sep. 14, 2008, 3 pages.

United States Patent and Trademark Office, Notice of Allowance issued in connection with U.S. Appl. No. 11/618,176, mailed Sep. 29, 2009 (6 pages).

Official Action, issued in U.S. Appl. No. 11618233, mailed Oct. 16, 2009, 17 pages.

Notice of Allowance, issued in U.S. Appl. No. 11618102, issued Oct. 22, 2009, 31 pages.

Notice of Allowance, issued in U.S. Appl. No. 11618144, issued Nov. 2, 2009, 8 pages.

\* cited by examiner

CONTENT DISPLAY MONITOR

RELATED APPLICATIONS

This patent arises from a continuation of U.S. patent application Ser. No. 09/490,495, which was filed on Jan. 25, 2000, and which is a continuation of U.S. patent application Ser. No. 08/707,279, now U.S. Pat. No. 6,108,637, which was filed on Sep. 3, 1996. Both U.S. patent application Ser. No. 09/490,495 and U.S. Pat. No. 6,108,637 are hereby incorporated herein by reference in their entirety.

BACKGROUND OF THE INVENTION

1. Field of the Invention

This invention relates to monitoring the display and observation of content by a computer system. The invention also relates to monitoring the display and observation at a content display site of content that is provided by a content provider site over a network to the content display site. The invention further relates to the provision of updated and/or tailored content from a content provider site to a content display site so that the content provider's current content is always displayed at the content display site.

2. Related Art

A large amount of human activity consists of the dissemination of information by information providers (content providers) to information consumers (observers). Recently, computer networks have become a very popular mechanism for accomplishing information dissemination. The use of computer networks for information dissemination has necessitated or enabled new techniques to accomplish particular functions related to the dissemination of information.

For example, information providers of all types have an interest in knowing the extent and nature of observation of the information that they disseminate. Information providers that disseminate information over computer networks also have this interest. However, the use of networked computers for information dissemination can make it difficult to ascertain who is observing the disseminated information and how, since information can be accessed rapidly from a remote location by any of a large number of possible observers whose identity is often not predictable beforehand, and since control over the display of the information once disseminated may not be possible, practical or desirable.

Among information providers, advertisers have particular interest in knowing how and to what extent their advertisements are displayed and/or observed, since such knowledge can be a key element in evaluating the effectiveness of their advertising and can also be the basis for payment for advertising. Mechanisms for obtaining such information have been developed for advertisements disseminated in conventional media, e.g., audiovisual media such as television and radio, and print media such as magazines and newspapers. For example, the well-known Nielsen television ratings enable advertisers to gauge the number of people that likely watched advertisements during a particular television program. As advertising over a computer network becomes more common, the importance of developing mechanisms for enabling advertisers to monitor the display and observation of their advertisements disseminated over a computer network increases.

Previous efforts to monitor the display of advertising (or other content) disseminated over a computer network have been inadequate for a variety of reasons, including the limited scope of the monitoring information obtained, the ambiguous nature of the monitoring information, the incompleteness of the monitoring information, and the susceptibility of the monitoring information to manipulation. Review of some of the techniques that have previously been used to acquire monitoring information regarding the display of content (e.g., advertising) disseminated over a particular computer network—the World Wide Web portion of the Internet computer network—will illustrate the deficiencies of existing techniques for monitoring the display of content disseminated over a computer network.

FIGS. 1A and 1B are simplified diagrams of a network illustrating operation of a previous system for monitoring requests for content over the World Wide Web. In FIGS. 1A and 1B, a content provider site 101 (which can be embodied by, for example, a server computer) can communicate with a content display site 102 (which can be embodied by, for example, a client computer) over the network communication line 103. The server computer at the content provider site 101 can store content colloquially referred to as a "Web page." The client computer at the content display site 102 executes a software program, called a browser, that enables selection and display of a variety of Web pages stored at different content provider sites. When an observer at the content display site 102 wishes to view a particular Web page, the observer causes the client computer at the content display site 102 to send a request to the appropriate server computer, e.g., the server computer at the content provider site 101, as shown in FIG. 1A. The server computers at content provider sites all include a software program (in the current implementation of the World Wide Web, this is an http daemon) that watches for such incoming communications. Upon receipt of the request, the server computer at the content provider site 101 transfers a file representing the Web page (which, in the current implementation of the World Wide Web, is an html file) to the client computer at the content display site 102, as shown in FIG. 1B. This file can itself reference other files (that may be stored on the server computer at the content provider site 101 and/or on other server computers) that are also transferred to the content display site 102. The browser can use the transferred files to generate a display of the Web page on the client computer at the content display site 102. The http daemon, in addition to initiating the transfer of the appropriate file or files to the content display site 102, also makes a record of requests for files from the server computer on which the daemon resides. The record of such requests is stored on the server computer at the content provider site 101 in a file 104 that is often referred to as a "log file."

The exact structure and content of log files can vary somewhat from server computer to server computer. However, generally, log files include a list of transactions that each represent a single file request. Each transaction includes multiple fields, each of which are used to store a predefined type of information about the file request. One of the fields can be used to store an identification of the file requested. Additional fields can be used to store the IP (Internet Protocol) address of the client computer that requested the particular file, the type of browser that requested the file, a time stamp for the request (i.e., the date and time that the request was received by the server computer), the amount of time required to transfer the requested file to the client computer, and the size of the file transferred. Other information about file requests can also be stored in a log file.

Previous methods for monitoring the display of content distributed over the World Wide Web have used the information stored in the log file. For example, one previous method has consisted of simply determining the number of transactions in the log file and counting each as a "hit" on a Web page, i.e., a request for a Web page. The number of hits is deemed to approximate the number of times that the Web page has been viewed and, therefore, the degree of exposure of the content of the Web page to information consumers.

There are a number of problems with this approach however. For example, as indicated above, a request for a Web page may cause, in addition to the request for an initial html file, requests for other files that are necessary to generate the Web page. If these other files reside on the same server computer as the initial html file, additional transactions are recorded in the log file. Thus, a request for a single Web page can cause multiple transactions to be recorded in the log file. As can be appreciated, then, the number of times that a Web page is transferred to a content display site can be far less than the number of transactions recorded in the log file. Moreover, without further analysis, there is no way to accurately predict the relationship between the number of transactions in the log file and the number of times that a Web page has been transferred to the content display site. Such inaccuracy can be very important to, for example, advertisers—whose cost of advertising is often proportional to the measured exposure of the advertising—since the measured exposure of their advertising (and, thus, its cost) may be based upon the number of hits on a Web page containing their advertisement.

A method to overcome this problem has been used. By analyzing the contents of the log file to determine which file was requested in each transaction, it may be possible to differentiate transactions in which the initial html file needed to generate a Web page is requested from transactions in which the requested file is one which is itself requested by another file, thus enabling "redundant" transactions to be identified and eliminated from the hit count. While such an approach can increase the accuracy of counting Web page hits, it still suffers from several problems.

For example, log file analysis may result in some undercounting of Web page hits, apart from any overcounting. This is because, once transferred to a client computer at a content display site, the files necessary to generate a Web page can be stored ("cached") on that client computer, thus enabling an observer at the content display site to view the Web page again without causing the client computer to make another request to the content provider server computer from which the Web page was initially retrieved. Consequently, the observer can view the Web page without causing transactions to be added to the log file, resulting in undercounting of the number of Web page hits.

Additionally, log files are subject to manipulation, either directly or indirectly. For example, an unscrupulous content provider could directly manipulate the log file by retrieving and editing the log file to add phony transactions, thus artificially increasing the number of Web page hits and making the Web page appear to be more popular than it really is. This problem can be ameliorated by causing the log files to be transferred periodically at predetermined times (e.g., each night at 12:00 midnight) from the server computer at the content provider site to a neutral network site; however, the log file can still be manipulated during the time between transfers.

A log file might be manipulated indirectly, for example, by programming one or more computers to continually request a Web page, thereby generating a large number of hits on that Web page. While the log file would contain transactions corresponding to actual file requests associated with the Web page, these requests would be artificial requests that would almost certainly not result in a display of the Web page, and certainly not in the observation of the Web page. Moreover, checking the contents of the log file for an unusually high number of requests from a particular IP address (i.e., client computer) may not enable such manipulation to be detected, since a large number of requests may legitimately come from a client computer that serves many users (for example, the proprietary network America Online™ has a handful of computers that are used by many users of that network to make connection to the Internet and World Wide Web).

It may be possible to identify the real origin of requests for content using "cookies." A cookie enables assignment of a unique identifier to each computer from which requests really emanate by transferring the identifier to that computer with content transferred to that computer. Future requests for content carry this identifier with them. The identifier can be used, in particular, to aid in identification of indirect log file manipulation, as described above, and, more generally, to enable more robust log file analysis.

Notwithstanding such enhancement, cookies do not overcome a fundamental problem with the use and analysis of log files to ascertain information regarding the display of content provided over the World Wide Web. That is, as highlighted by the overcounting problem associated with the above-described artifice and the undercounting problem associated with caching of content at the content display site, log files only store information about file requests. A log file does not even indicate whether the requested file was actually transferred to the requesting client computer (though, typically, such file transfer would occur). Nor does a log file include any information about how the file was used once transferred to the requesting client computer. In particular, log files do not provide any information regarding whether the content represented by the requested file is actually displayed by the client computer at the content display site, much less information from which conclusions can be deduced regarding whether—and if so, how—the content was observed by an observer. These limitations associated with the content of a log file cannot be overcome by a monitoring approach based on log file analysis. Moreover, log file analysis is calculation intensive, requiring hours in some instances to extract the desired information from the log file.

Another method of monitoring the display of content disseminated over the World Wide Web uses an approach similar to that of the Nielsen ratings system used in monitoring television viewing. In this method, monitoring software is added to the browser implemented on the client computers of a selected number of defined observers (e.g., families) to enable acquisition of data regarding advertising exposure on those computers. This information is then used to project patterns over the general population.

However, this approach also has several disadvantages. First, only a limited amount of data is collected, i.e., data is only obtained regarding a small number of information consumers. As with any polling method, there is no guarantee that the data acquired can be extrapolated to the general population, even if the observers selected for monitoring are chosen carefully and according to accepted sampling practices. Second, as the size of the World Wide Web (or other computer network for which this method is used) grows, i.e., as the number of content provider sites increases, the number of monitored observers necessary to ensure accurate representation of the usage of all content provider sites must increase, since otherwise there may be few or no observer interactions with some content provider sites upon which to base projections. It may not be possible to find an adequate number of appropriate observers to participate in the monitoring process, particularly given concerns with the attendant intrusion into the privacy of the selected observers. Third, installation of the monitoring software on a client computer to be compatible with a browser presents a number of problems. Such installation requires active participation by observers; since observers typically do not reap benefit from operation of the monitoring software, they may be reluctant to expend the effort to effect installation. The monitoring software must continually be revised to be compatible with new browsers and new versions of old browsers. To enable monitoring of a large number of client computers, the software must be tested for compatibility with a wide variety of computing environments. And, as currently implemented, such monitoring software is also dependent upon the computing platform used, making it necessary to revise the monitoring software for use with new computing platforms or risk skewing the demographics of the sample users.

In addition to desiring information regarding the display and observation of the content that they provide, content providers also often desire to provide content to a content display site that is particularly tailored for observation (e.g., according to various demographic characteristics of an expected observer) at that content display site. For example, text content should be expressed in a language that the observer can understand. If appropriate for the content, it is desirable to tailor the content according to, for example, the age, sex or occupation of the observer.

Such tailoring of content has previously been enabled by modifying the http daemon on a computer at the content provider site to cause a particular version of a set of content to be transferred to a requesting content display site based upon the IP address of that content display site. While such tailoring of content is useful, it is desirable to be able to tailor the presentation of content in additional ways not enabled by this approach.

Content providers also often desire to provide their content with the content of other content providers. For example, it is a common practice for content providers (referred to here as "primary content providers") on the World Wide Web to include advertisements from other entities (referred to here as "secondary content providers") as part of the content provider's Web page. In such situations, it is desirable for the secondary content provider to be able to easily update and/or appropriately tailor (e.g., according to characteristics of the requester) the content that they supply to the primary content provider. This could be accomplished by causing the primary content provider site to contact the secondary content provider site—each time that the primary content provider receives a request for content that includes the secondary content—to retrieve the secondary content (thus ensuring that updated, appropriately tailored secondary content is used) or check whether updated or tailored secondary content is available (if so, the content is retrieved). (This method could also be modified so that content retrieval or a check for updated and/or tailored content is only performed according to a predetermined schedule.) However, both the primary content provider and the secondary content provider may not want their systems burdened with the extra computational capacity required to handle the multitude of requests that would be needed to effect this operation. Alternatively, the primary content provider could collect and store the updated and tailored content from the secondary content providers at the primary content provider site. However, the burden associated with collecting and managing the content from secondary content providers may be more than the primary content provider wants to shoulder.

One way that this functionality can be achieved without creating an undesirable burden on the primary or secondary content providing systems is by providing a secondary content storage site that can continually store the most recent content provided by a secondary content provider, as well as different sets of content tailored for particular situations (e.g. display by particular observers or at particular times). FIGS. 2A through 2D are simplified diagrams of a network illustrating the operation of such a system In FIG. 2A, a content display site 202 makes a request over the network communication line 203 to the primary content provider site 201 for content that includes the secondary content. In FIG. 2B, the primary content provider site 201 transfers the file or files stored at the primary content provider site 201 that are necessary to generate a display of the primary content. These files include appropriate reference to a file or files stored at a secondary content storage site 204 that includes the most updated and/or appropriately tailored secondary content for display with the primary content. As shown in FIG. 2C, this reference causes the content display site 202 to request the secondary content from the secondary content storage site 204. In FIG. 2D, the secondary content is transferred from the secondary content storage site 204 to the content display site 202 for display at the content display site 202.

However, while this system can relieve the primary content provider of the burden of managing the acquisition, storage and provision of secondary content (a burden that can become rather onerous when many secondary content providers are providing content to the primary content provider), the system has a characteristic that can make it undesirable for many content providers. The secondary content storage site not only manages the secondary content, it also provides the secondary content when requests for primary content are made to the primary content provider. Moreover, the secondary content is frequently content, such as graphics files used to generate visual images (which frequently dominate advertisements), that has a high bandwidth requirement for transmission over the network. By taking control of the transmission of secondary content to the content display site, the secondary content storage site is also frequently taking control of the most bandwidth sensitive parts of the content provided by the primary content providers. The operator of the secondary content storage site may not provide a system that addresses the bandwidth requirements to the satisfaction of the primary content provider, so that the presentation of the combined primary and secondary content occurs more slowly than desired by the primary content provider. Thus, this approach causes the primary content provider to lose control of a critical aspect of their operation.

SUMMARY OF THE INVENTION

The invention can enable monitoring of the display of content by a computer system. Moreover, the invention can enable monitoring of the content display to produce monitoring information from which conclusions may be deduced regarding the observation of the content display by an observer. The invention can also enable monitoring of the display at a content display site of content that is provided by a content provider site over a network to the content display site. Additionally, the invention can enable the expeditious provision of updated and/or tailored content over a network from a content provider site to a content display site so that the content provider's current and appropriately tailored content is always displayed at the content display site.

Aspects of the invention related to transfer of content over a network are generally applicable to any type of network. However, it is contemplated that the invention can be particularly useful with a computer network, including private computer networks (e.g., America Online™) and public computer networks (e.g., the Internet). In particular, the invention can be advantageously used with computer networks or portions of computer networks over which video and/or audio content are transferred from one network site to another network site for observation, such as the World Wide Web portion of the Internet. Additionally, the invention is particularly useful in monitoring the display of content obtained over such a network using an interactive browser to acquire and view the content in real time.

In one aspect of the invention, the display of content by a computer system can be monitored by monitoring the position of the content display on a display screen of the computer system and evaluating the position of the content display on the display screen to produce monitoring information regarding display of the content. Monitoring of content display according to this aspect of the invention can be further enabled by monitoring the position of one or more other images on the display screen and comparing the position of the content display to the position of the other images to produce the monitoring information. In particular, this aspect of the invention can enable a determination as to whether (and for how long) the content display is hidden by one of the other images, and, further, whether the content display is fully hidden or partially hidden (and for how long the content display is fully and partially hidden, respectively). This information can be useful to, for example, indicate the amount of time that the content display was visible to an observer for observation, or to aid the content provider in determining in which regions of a display screen his content is most likely to be unobstructed. This aspect of the invention can also enable determination of the number of times that an on-screen pointer (e.g., a mouse arrow or a cursor) entered an area defined by the content display. This information may be useful in determining how attentive the observer was to the content, since an observer frequently watches the position of the on-screen pointer when viewing the display screen.

In another aspect of the invention, the display of content by a computer system can be monitored by monitoring the change in time of a characteristic of the content display and evaluating the change in time of the characteristic of the content display to produce monitoring information regarding display of the content. Monitoring of content display according to this aspect of the invention can be further enabled by monitoring the change in time of a characteristic of the computer system and comparing the change in time of the characteristic of the content display to the change in time of the characteristic of the computer system to produce the monitoring information. This aspect of the invention can also enable, as discussed above, determination as to whether (and for how long) the content display is fully or partially hidden by another displayed image, as well as the number of times that an on-screen pointer entered an area defined by the content display.

In still another aspect of the invention, in a computer system in which the content is displayed in response to an instruction that is provided from a source external to the computer system and the system for monitoring (e.g., an instruction provided by a user of the computer system), the beginning and end of a display of the content can be ascertained so that monitoring of the display of content by the computer system can begin at the beginning of the content display and end at the end of the content display. The monitoring can occur in accordance with other aspects of the invention described herein. The monitoring can also determine the duration of the display of the content. Since the occurrence of monitoring according to this aspect of the invention is coincident with the display of the content to be monitored, the monitoring expends processing capability of the computer system only when necessary, while simultaneously assuring that monitoring occurs at all times that the content is displayed.

In yet another aspect of the invention, where content is provided by a content provider site over a network to a content display site for display at the content display site, a mechanism for monitoring the display of the content can be transferred from the content provider site to the content display site in response to (e.g., together with) the transfer of content from the content provider site. The monitoring can occur in accordance with other aspects of the invention described herein. Monitoring information obtained regarding the display of the content at the content display site can be transferred to a remote site that is part of the network. The remote site can, but need not necessarily be, the content provider site from which the content was transferred to the content display site. Where the remote site is such content provider site, the monitoring information can then, in turn, be transferred from the content provider site to a second remote site. Further, where the remote site is such content provider site, the monitoring information can be transferred from the content display site to the content provider site via a communication means that is different from the communication means used to transfer the content from the content provider site to the content display site, a feature that can be useful, for example, when the network is the World Wide Web. This aspect of the invention provides a heretofore unavailable monitoring capability for obtaining information about how content is displayed on a network such as the World Wide Web. In particular, it has not previously been possible to monitor content transferred from a content provider site on the World Wide Web once the content has been transferred to a content display site.

In a still further aspect of the invention, in a network which operates according to a protocol that enables new content to be transferred to a content display site in response to selection of a portion of the content currently being displayed at the content display site, a mechanism for monitoring the display of content can be transferred from a content provider site to a content display site so that the mechanism for monitoring operates at the content provider site. The monitoring can occur in accordance with other aspects of the invention described herein. Monitoring information obtained regarding the display of the content at the content display site can be transferred to a remote site that is part of the network. This aspect of the invention is particularly advantageous when at least some of the content being monitored comprises a graphical display. As discussed above with respect to the immediately preceding aspect of the invention, this aspect of the invention provides a heretofore unavailable monitoring capability for obtaining information about how content is displayed when retrieved over a network in an interactive browsing environment, such as occurs on the World Wide Web.

In yet a further aspect of the invention, the display of content that is provided by a content provider site over a network to the content display site is monitored to produce monitoring information, then the monitoring information is transferred to a remote site of the computer network that is different from the content provider site. According to this aspect, the monitoring information can first be transferred to the content providing site before eventual transfer to the remote site, so long as the monitoring information cannot be stored at the content provider site, or accessed or manipulated at the content provider site before transfer to the remote site. Access to the monitoring information at the remote site can be allowed to enable interaction with, but not modification of, the monitoring information. This aspect of the invention provides a system configuration that can overcome the problem of possible tampering with the substance of the monitoring information by the content provider. Further, this aspect of the invention can be implemented so that the content and the monitoring instructions are stored at the remote site and transferred to the content display site when requested by an observer at the content display site, thus relieving the content provider of storing and managing the content and monitoring instructions at the content provider site and thereby simplifying use of the invention for the content provider.

In another aspect of the invention, current and/or tailored content can be provided to a content display site from a content provider site. The content can include both primary content (from the content provider site) and secondary content (provided by third parties). The primary and secondary content can be provided from a secondary content provider site to an application manager site. When the application manager site receives new content (in particular, updated and/or tailored content) from any content provider site, that content is transferred to content provider sites that use that content. Updated and/or tailored content is therefore available for transfer to a content display site immediately upon receipt of a request for the content from the content display site. This aspect of the invention relieves the primary content provider of the need to manage the storage of content, while reserving control over the provision of that content to the primary content provider, thereby enabling the content provider to ensure that the bandwidth requirement of the content provided from the content provider site are met

DETAILED DESCRIPTION OF THE INVENTION

The invention includes several aspects related to the display of content to an observer. For example, the invention can enable monitoring of the display of content by a computer system. In particular, the invention can enable monitoring of the displayed content in a manner that provides monitoring information from which aspects of the user's observation of the content can be gleaned. The invention can also enable monitoring of the display and—using the aforementioned capability—the observation at a content display site of content that is provided by a content provider site over a network to the content display site. Additionally, the invention can enable the expeditious provision of updated and/or tailored content over a network from a content provider site to a content display site so that the content provider's current and appropriately tailored content is always displayed at the content display site.

Herein, "content" refers generally to any sensory images (or data used to produce those sensory images) displayed by a device with which the invention is used. "Observation" refers to the perception of content by an observer. Typically, the content will be visual or aural images produced by the device; observation of such content thus consists of viewing or listening, as appropriate, to the produced images.

Certain aspects of the invention relate to the monitoring of content obtained from, or provision of content over, a network. "Content provider site" refers to a device that is part of the network and that can provide content to another device that is part of the network. "Content display site" refers to a device that is part of the network and that can receive and display content from another device that is part of the network. It is contemplated that the invention can be particularly useful with a computer network that operates in this way. "Computer network" includes any collection of interconnected computer systems. "Computer system" refers to a device or collection of devices which depend upon a computational device (e.g., a general or special purpose processor) for at least some aspects of their operation. In particular, as used herein, a "computer system" can include any type of display device, including a conventional computer display monitor, a television, or one or more audio speakers.

Figure 1A:
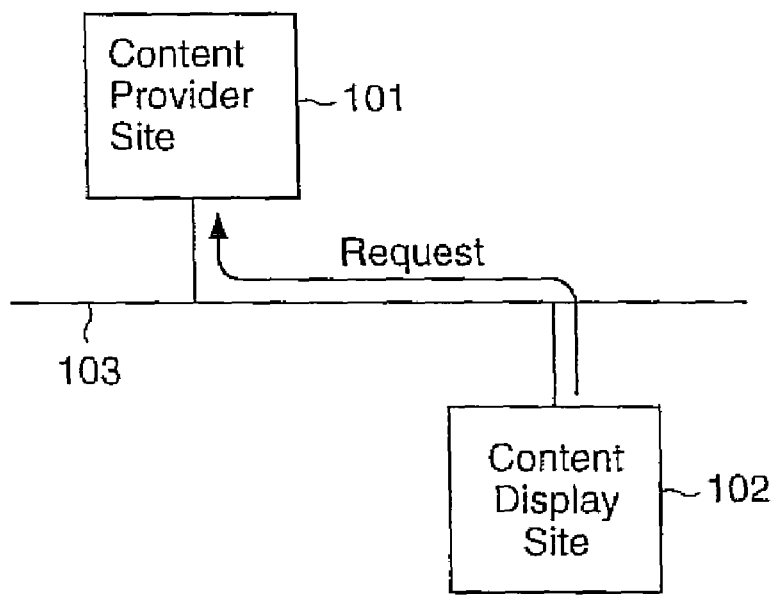
FIGS. 1A and 1B are simplified diagrams of a network illustrating operation of a previous system for monitoring requests for content over the World Wide Web.
Figure 1B:
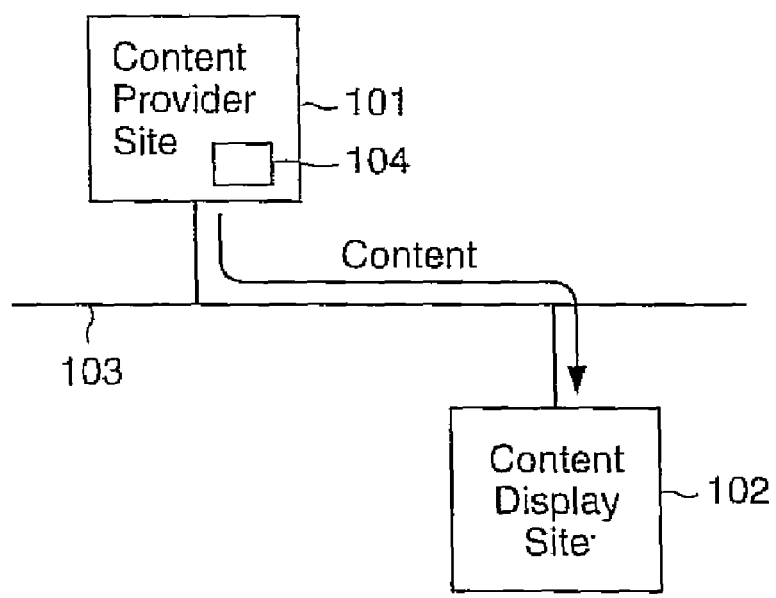
Figure 2A:
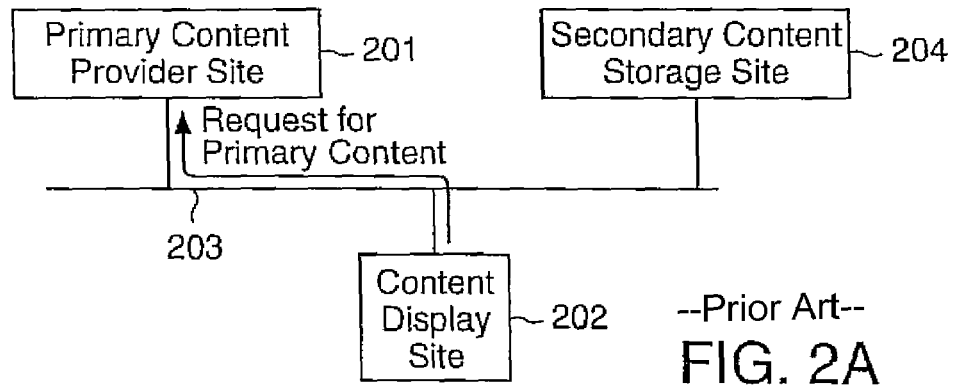
FIGS. 2A, 2B, 2C and 2D are simplified diagrams of a network illustrating operation of a previous system for enabling retrieval of updated and/or tailored secondary content for use in primary content provided over the network.
Figure 2B:
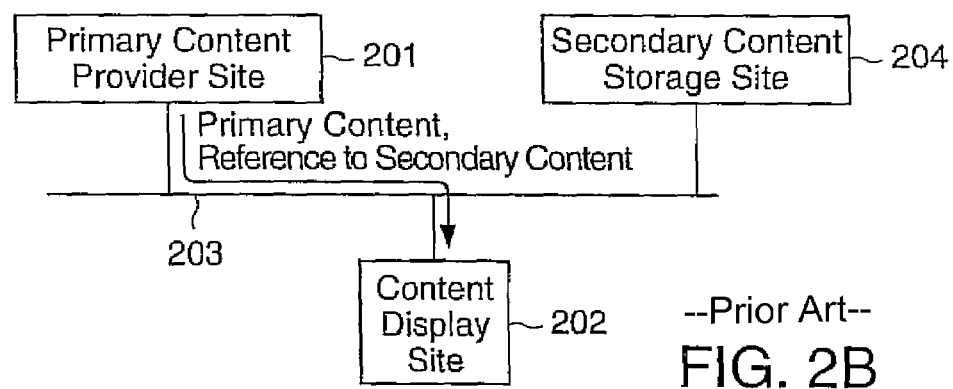
Figure 2C:
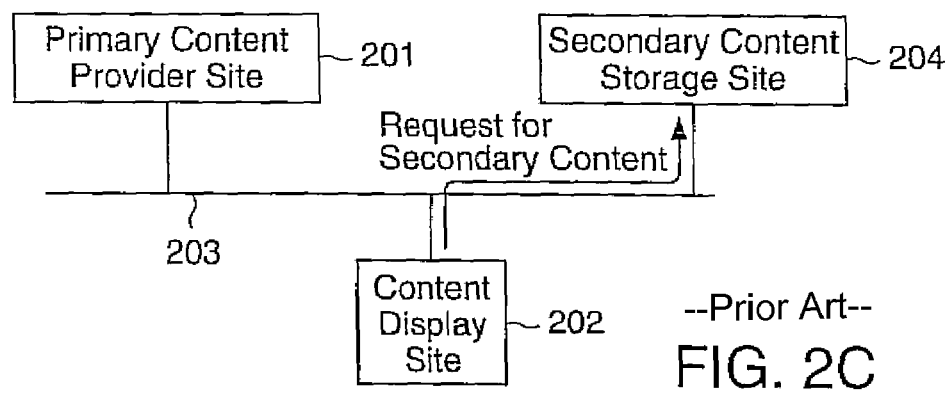
Figure 2D:
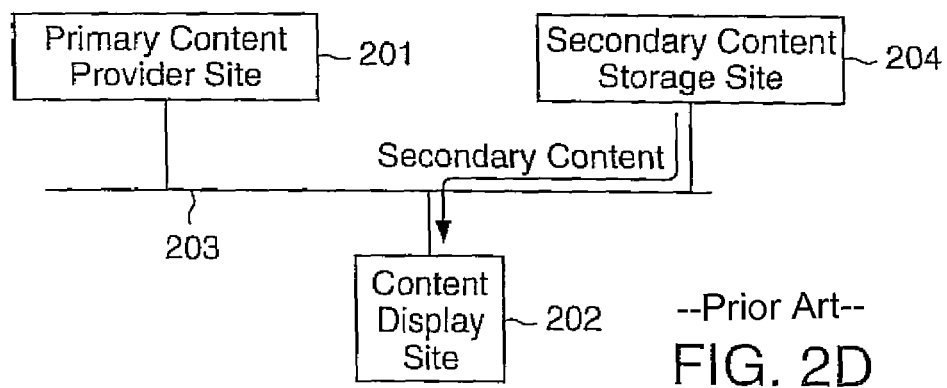
Figure 3A:
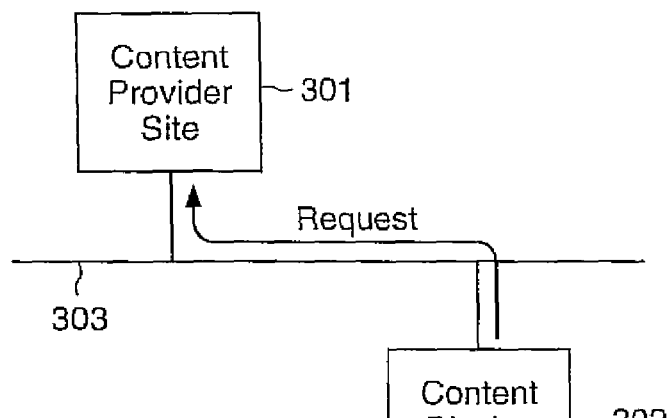
FIGS. 3A, 3B and 3C are simplified diagrams of a network illustrating operation of one embodiment of the invention.
Figure 3B:
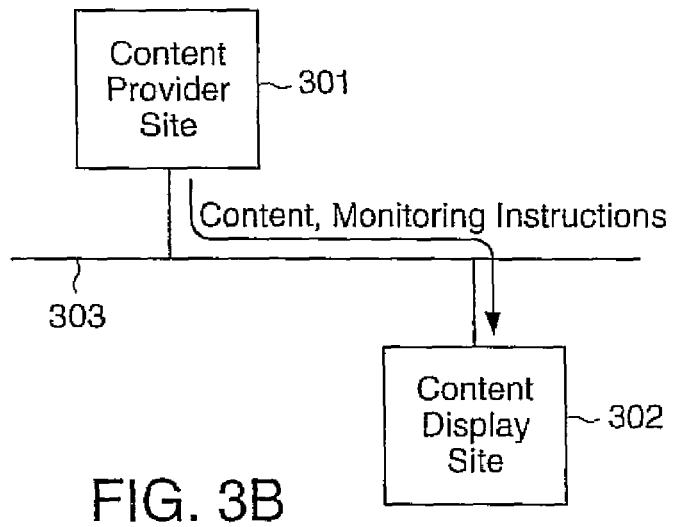
Figure 3C:
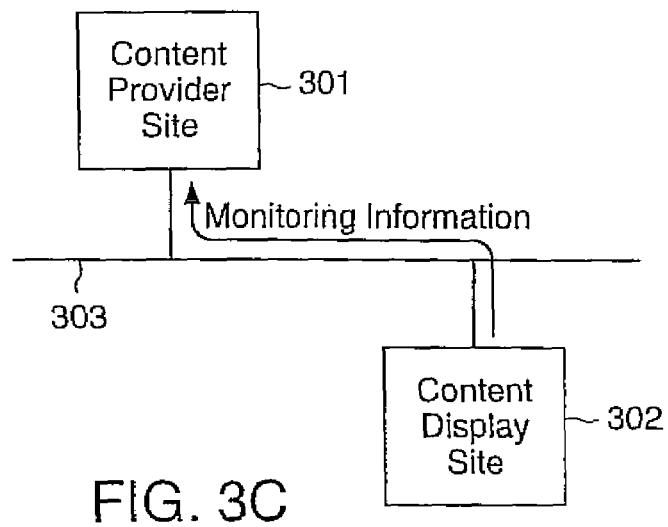

FIGS. 3A, 3B and 3C are simplified diagrams of a network illustrating operation of one aspect of the invention. A content display site 302 (which can be embodied by a conventional client computer) is linked via a network communication line (or lines) 303 to a content provider site 301 (which can be embodied by a conventional server computer). (Typically, the network links multiple content display sites with multiple content provider sites; a single content display site 302 and a single content provider site 301 are shown in FIGS. 3A, 3B and 3C for simplicity. Additionally, it is to be understood that each site on the network can function as both a content display site and a content provider site.) As shown in FIG. 3A, the client computer at the content display site 302 requests content from the server computer at the content provider site 301 over the network communication line 303. As shown in FIG. 3B, the server computer at the content provider site 301 provides content to the client computer at the content display site 302 over the network communication line 303. According to this aspect of the invention, in response to the request for content from the content provider site 301, a set of monitoring instructions (which can be embodied, for example, in a computer program) are also transferred to the content display site 302. The transfer of the monitoring instructions can occur before, with or after the transfer of the content. As explained in more detail below, the monitoring instructions cause the client computer at the content display site 302 to monitor the display of the content to produce monitoring information regarding the manner in which the content is displayed. As shown in FIG. 3C, the monitoring information is transferred from the content display site 302 to the content provider site 301 over the network communication line 303. (The monitoring information could, alternatively or additionally, be transferred to another site that is part of the network.) Review of the monitoring information produced by the monitoring instructions can enable conclusions regarding the user's observation of the content to be deduced, as explained in more detail below. (It should be noted that, more generally, monitoring instructions according to the invention can be used to monitor the display of content on a computer system whether or not the computer system is part of a network and receives content and monitoring instructions over the network.)

The invention can be used with both public computer networks (e.g., the Internet) and private computer networks (e.g., commercial online services such as America Online™, Prodigy™ and CompuServe™, as well as intranets). In particular, the invention can be advantageously used with computer networks or portions of computer networks over which video and/or audio content are transferred from one network site to another network site for display. Further, the invention can advantageously be used with a network in which the network sites can be accessed in real time with a browser. ("Browser" can refer to a computer program which can interpret hypertext files and display the content corresponding to those files, as well as enable transfer from one hypertext file to another via a hyperlink within the hypertext file being transferred from.) The World Wide Web portion of the Internet is a well-known current example of such a network with which the invention can be used. Below, some aspects of the invention are described, for purposes of illustration, as implemented in a manner that is compatible with the World Wide Web, i.e., in accordance with the hypertext markup language (html) and the hypertext transfer protocol (http). However, none of the aspects of the invention are limited to such implementation.

When the invention is used with a computer network or to monitor display of content by a computer system, aspects of the invention can be implemented as one or more computer programs that can be executed by a computer to achieve the functionality of that aspect. Generally, such computer programs can be implemented using any appropriate computer programming language. However, when an aspect of the invention is used with a computer network that includes computers of many different types (such as the Internet), the computer programming language is preferably one that can be executed by any type of computer (i.e., the computer programming language is platform independent). The Java programming language, developed by sun Microsystems, Inc. of Mountain View, Calif., is one such computer programming language. Below, some aspects of the invention are described, for purposes of illustration, as implemented in the Java programming language. Again, however, none of the aspects of the invention are limited to such implementation.

In one embodiment of the invention, the monitoring instructions are transferred to the content display site 302 together with the content. In a particular embodiment, the monitoring instructions are part of a computer program that also includes instructions for displaying the content. Illustratively, such a computer program can be an applet written in the Java programming language. As will be appreciated by those skilled in the use of html, Example 1 below illustrates a set of instructions in accordance with the html syntax that can be used to cause execution of an applet that both displays content and monitors the display.

EXAMPLE 1

```
<applet code="AdInsert.class" width=230 height=33>
<param name="image" value="images/southwest.gif">
<param name="href" value="http://www.swa.com/">
</applet>
```

The instructions shown in Example 1 are executed by a conventional browser implemented on a computer at a content display site when an observer at the content display site makes a request for (e.g., selects a hyperlink) the content represented by the file "southwest.gif." The request is received by an http daemon at the appropriate content provider site. The instructions identify the location ("image") at the content provider site of an applet (a small application program) called "AdInsert" that includes further instructions which, when executed, perform a monitoring method according to the invention, as well as cause the content to be displayed. (The steps that can be implemented in such a monitoring method are discussed further below.) Upon receipt of the request by the http daemon at the content provider site, the AdInsert applet is transferred to the requesting content display site and begins executing. The instructions in Example 1 also establish the size of the area (width and height) in which the content is displayed on a computer display screen, as well as indicate a network site ("href") to which connection can be made by selecting a hyperlink within the content. Thus, illustratively, in accordance with the invention, content from a content provider site that can be accessed by a browser (such as a network site that is part of the World Wide Web) can be transferred to and displayed at a content display site by transferring an applet to the content display site that can be executed by the browser to both display the content and cause aspects of the display of the content to be monitored. (Note that the content being monitored can comprise all of the content being displayed, or only a part of the content being displayed, e.g., an advertisement present in a Web page.)

In contrast, previously, only content has been transferred to content display sites, using an html syntax as shown in Example 2 below for the content that is displayed by the html syntax shown in Example 1 above.

EXAMPLE 2

```
<a href="http://www.swa.com/">
<img border=0 src="/images/southwest.gif" height=33 width=230>
</a>
```

Thus, previously, it has not been possible to monitor content transferred from a content provider site on the World Wide Web once the content has been transferred to the content display site. As can be appreciated, then, this aspect of the invention provides a powerful tool, not previously available, for obtaining information about how content is displayed on a computer network such as the World Wide Web.

Implementation of a monitoring method as described immediately above means that the operation of the monitoring method is coincident with the display of the content to be monitored. Since the monitoring method does not operate when the content is not being displayed, the monitoring method expends processing capability of the computer system at the content display site only when necessary. At the same time, operation of the monitoring method at all times when the content is displayed is assured.

Further, since the monitoring method can be implemented as part of a broader method according to the invention that also causes the content to be displayed, the problems previously noted with monitoring the display of content that is cached at the content display site are overcome. This is because, unlike the previous use of log files—which require that a request be made to a content provider site in order that any information be recorded—a monitoring method according to the invention can record monitoring information any time that the content is displayed, without regard to the manner in which the display is requested. In particular, the invention can enable the number of times that a particular set of content is displayed to be precisely counted. This is a huge improvement over previous methods as described above, which not only do not count the number of times that the content is displayed (they count requests), but may not even count the number of requests accurately.

The instructions that implement a monitoring method according to the invention can be used to obtain a large variety of monitoring information. For example, the contents of conventional log files (discussed above) can be ascertained by a monitoring method of the invention. An important aspect of the invention, however, is that monitoring information beyond that available in a conventional log file can also be obtained by a monitoring method according to the invention. Instructions for obtaining several types of such monitoring information are described below. However, it is to be understood that the descriptions below are merely illustrative of the types of monitoring information that can be obtained; the obtaining of other types of monitoring information is also contemplated by the invention.

For example, a monitoring method according to the invention can detect each time that the content is displayed. In fact, in one embodiment of a monitoring method according to the invention, the monitoring method does no more than this. A monitoring method that detects the display of the content can be implemented by an applet as described above. The "monitoring instructions" of such an applet may be no more than an instruction that causes an indication that the applet has executed to be stored or transferred to an appropriate network site (discussed further below). A monitoring method that can ascertain whether the content was displayed or not can be a very useful monitoring method that provides important basic information not previously available in an interactive browsing environment for acquiring and viewing content. In particular, undercounting (due to, for example, caching of content at the content display site) and overcounting (due to, for example, submission of artificial requests for content that do not result in the display of content) of the number of times that the content is displayed are avoided.

A monitoring method according to the invention can also determine the duration of the content display. For example, the duration of the content display can be determined as the amount of time that the computer program for displaying the content executed, as indicated by time stamps—ascertainable, for example, using a method that exists as part of the Java language—associated with a predefined beginning and end of execution of the program.

In one embodiment of the invention, a monitoring method monitors the position of the content on a display screen while the content is being displayed. The position is evaluated to produce monitoring information regarding the display of the content. Such evaluation can be accomplished, for example, by further obtaining information regarding the position of one or more other images on the display screen, and comparing the position of the content to the position of the one or more other images.

For example, in accordance with the above embodiment, the monitoring method can determine whether the content is not visible on the display screen, either because the content is occluded by the one or more other images, or because the content has been "scrolled" off of the display screen (hereafter, these two situations will be referred to together by saying that the content is "hidden"). Further, the monitoring method can determine whether the content is partially hidden, i.e., either partially occluded by the one or more other images, or partially scrolled off of the display screen. Moreover, the duration of time of each period during which the content is fully or partially hidden can be determined as such periods occur. The duration of time of unobstructed displays of the content can be determined as times when the view of the content is not either fully or partially hidden. Each of the durations can be reported directly and/or the total duration that the content is fully hidden, partially hidden, fully or partially hidden and/or unobstructed, respectively, can be reported.

Information regarding whether or not the displayed content is hidden can be useful for a variety of reasons. For example, such information indicates the amount of time that the displayed content was visible to the observer for observation. Additionally, this information can be used by the content provider to determine in which regions of a display screen his content is most likely to be unobstructed.

Whether the displayed content is hidden can be determined in any manner that is possible using the tools (e.g., supported programming language, operating system characteristics) associated with the computer network with which the invention is being used. One way of determining whether the displayed content is hidden using the above-described applet is to periodically declare that the content display (or a portion thereof) is invalid, i.e., the operating system is asked to redraw the content display, if necessary. If the operating system then makes a request to the applet to redraw the content display, then the content display is not hidden. However, if the operating system does not make a request to the applet to redraw the content display, then the content display is hidden.

The most complete information regarding whether the content display is hidden can be obtained by invalidating each discrete element of the content display (e.g., pixel) and determining whether the discrete element is hidden, in the manner described above. However, such an approach is computationally expensive and is generally not necessary to obtain useful and sufficiently accurate information regarding whether the content display is hidden. Preferably, then, only a portion of the content display, strategically selected, is evaluated in this manner.

For example, in one embodiment of the invention, each of the corners of the content display are invalidated and monitored for redrawing as described above. If all of the corners are redrawn, then the content display is determined to be unobstructed. If none of the corners are redrawn, then the content display is determined to be fully hidden. If at least one, but not all, of the corners are redrawn, then the display is determined to be partially hidden.

Figure 4A:
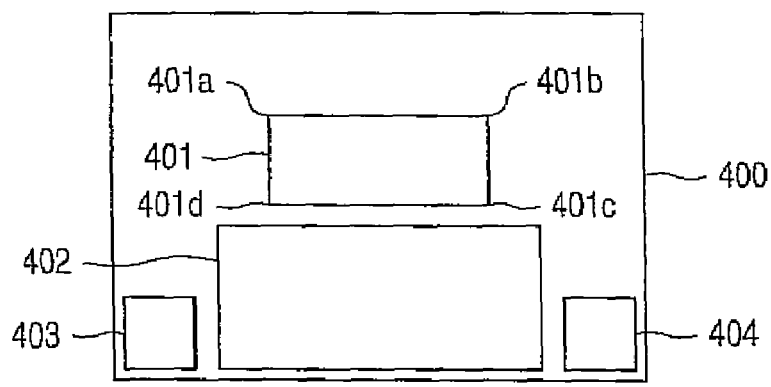
FIGS. 4A, 4B and 4C are simplified views of a display screen including a content display and other images, illustrating an unobstructed, fully hidden, and partially hidden content display, respectively.
Figure 4B:
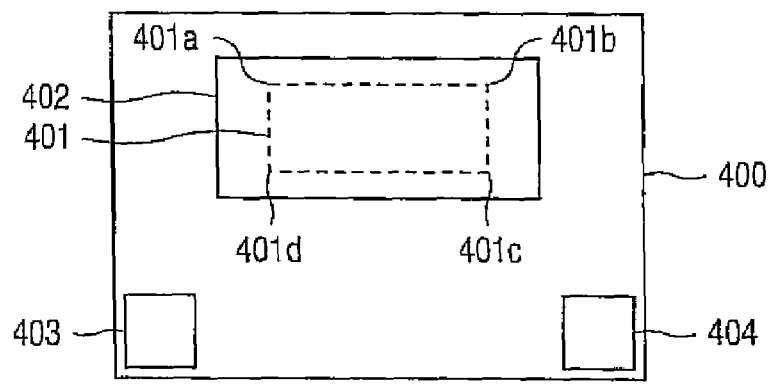
Figure 4C:
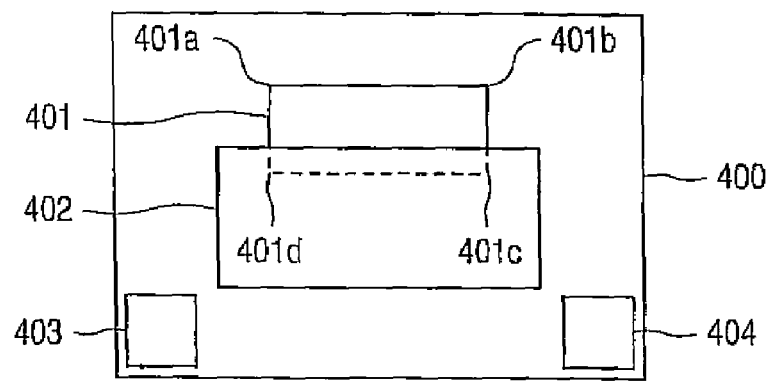

FIGS. 4A, 4B and 4C are simplified views of a display screen 400 including a content display 401 and other images 402, 403 and 404, illustrating an unobstructed, fully hidden, and partially hidden content display, respectively. In FIG. 4A, none of the corners 401a, 401b, 401c or 401d are covered by one of the other images 402, 403 and 404. Thus, after the corners 401a, 401b, 401c and 401d are invalidated, each is redrawn, and the content display 401 is (correctly, in this case) determined to be unobstructed. In FIG. 4B, each of the corners 401a, 401b, 401c and 401d is covered by the image 402. Thus, none of the corners 401a, 401b, 401c and 401d are redrawn after being invalidated, and the content display 401 is (again, correctly) determined to be fully hidden. In FIG. 4C, the corners 401c and 401d are covered by the image 402, but the corners 401a and 401b are not. Thus, only the corners 401a and 401b are redrawn after invalidation of the corners 401a, 401b, 401c and 401d, and the content display 401 is (once again, correctly) determined to be partially hidden.

Figure 4D:
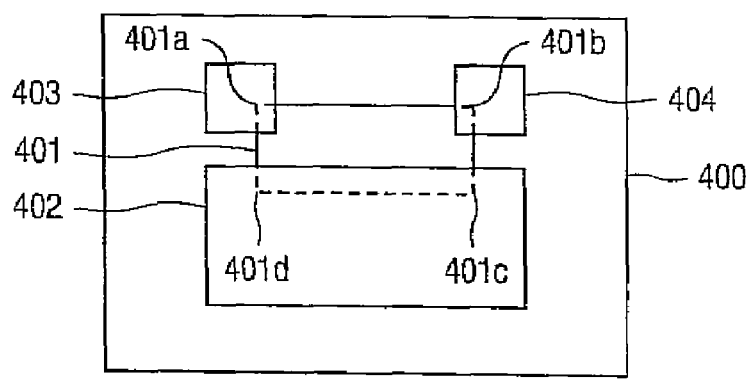
FIG. 4D is a simplified view of a display screen including a content display and other images, illustrating a content display that is only partially hidden, but that would be determined to be fully hidden according to a method of the invention.

The above approach may not be accurate in all cases. FIG. 4D is a simplified view of the display screen 400 including the content display 400 and other images 402, 403 and 404, illustrating a partially hidden content display 401 that would be determined to be fully hidden according to the method of the invention detailed above. In FIG. 4D, the image 402 covers the corners 401c and 401c, the image 403 covers the corner 401a, and the image 404 covers the corner 401b. Thus, since none of the four corners 401a, 401b, 401c and 401d is redrawn after being invalidated, the content display 401 is determined to be fully hidden; however, as can be seen in FIG. 4D, this is not the case.

Figure 4E:
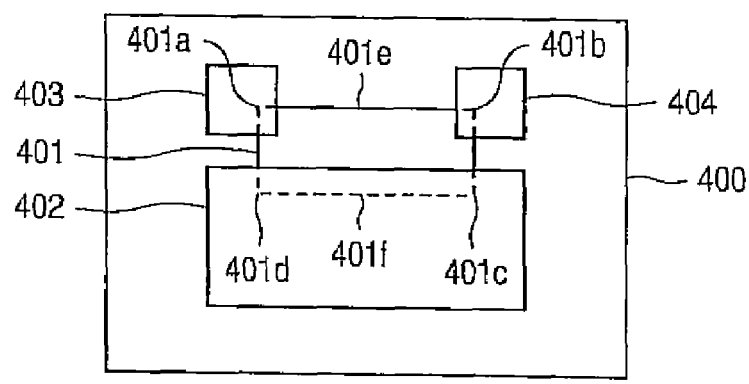
FIG. 4E is a simplified view of the display screen shown in FIG. 4D, illustrating how another method of the invention can correctly determine the content display to be partially hidden.

This problem can be alleviated by evaluating other discrete elements of the content display in addition to the corners. For example, discrete elements at the center of the upper and lower edges, and/or the right and left edges of the content display could be evaluated in addition to the corner pixels. FIG. 4E is a simplified view of the display screen 400 as shown in FIG. 4D, illustrating how another method of the invention can correctly determine the content display 401 to be partially hidden. In FIG. 4E, the upper edge center 401e and the lower edge center 401f of the content display 401 are also evaluated. The lower edge center 401f is covered by the image 402, while the upper edge center 401e is not. Thus, after invalidation of the corners 401a, 401b, 401c and 401d; and the centers 401e and 401f, the upper edge center 401e is redrawn, and the content display 401 is (correctly) determined to be partially hidden.

Figure 4F:
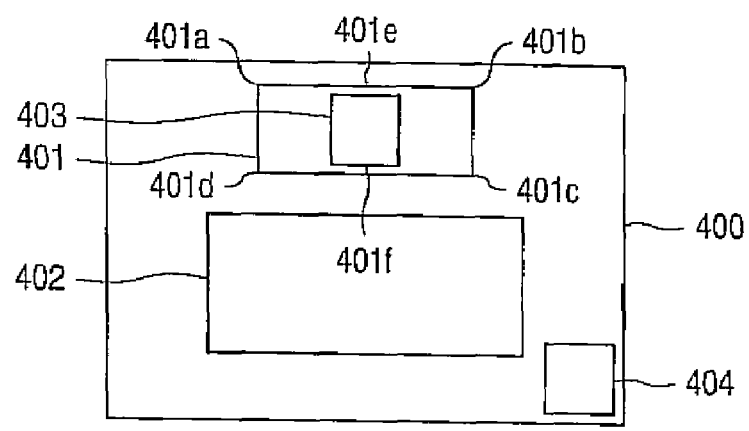
FIG. 4F is a simplified view of a display screen including a content display and other images, illustrating a display that is partially hidden, but that may be determined to be unobstructed according to a method of the invention.

FIG. 4F is a simplified view of the display screen 400, including the content display 401 and other images 402, 403 and 404, illustrating a partially hidden content display 401 that may be determined to be unobstructed according to a method of the invention. In FIG. 4F, none of the corners 401a, 401b, 401c and 401d, or the centers 401e and 401f are covered by the images 402, 403 and 404. Thus, after invalidation of the corners 401a, 401b, 401c and 401d, and the centers 401e and 401f, each is redrawn, and the content display 401 is determined to be unobstructed. However, as can be seen in FIG. 4F, this is not the case, since the image 403 is positioned in the middle of the content display 401.

As illustrated in FIGS. 4D through 4F, while the evaluation of additional discrete elements of a content display does not eliminate the possibility of an inaccurate determination regarding whether the content display is hidden, it does reduce the likelihood of such occurrence. Generally, any number and configuration of discrete elements of a content display can be evaluated to reduce the possibility of an incorrect determination regarding whether the content display is hidden, so long as the associated computational cost does not become unacceptably high. Further, the above-described method for determining whether a content display is hidden is only one way in which such determination can be made.

As part of determining whether the content display is hidden, a time stamp is recorded each time there is a change in the "hidden state" of the content display. From these time stamps, the duration of each period of time that the content display is unobstructed, partially hidden and fully hidden can be determined. From the duration of each period, total durations of time that the content display is unobstructed, partially hidden and fully hidden can also be determined.

It may also be possible, by appropriately configuring the discrete elements of the content display that are evaluated, to determine (though, typically, approximately), when the content display is partially hidden, the amount of the content display that is visible. It can be possible, too, when the content display is partially hidden, to give a qualitative description of the portion of the content display that is hidden (or visible), e.g., upper right corner, lower left corner.

When the monitoring method operates on a computer system having an event-driven operating environment, the monitoring method can monitor events as transmitted by the operating system to ascertain information regarding the content display. When the monitoring method is implemented as an applet that also displays the content, such monitoring can occur naturally, since only events concerning the content display are transmitted to the monitoring method. For example, the applet can use a pre-existing Java method (e.g., the method named HandleEvent in a current version of Java) to monitor events as transmitted by the operating system. Such event monitoring can be used to, for example, determine the number of times that an on-screen pointer (e.g., a mouse arrow or a cursor) entered an area defined by the content display. (The defined area can be related to the content display in any manner and can be, for example, the area in which the content is displayed, or an area somewhat smaller or larger than the area of the content display.) The operating system of the computer system displaying the content display typically monitors the position of the on-screen pointer and can identify in which region on the display screen the pointer is located. Thus, an applet configured to display content, as described above, can discern whether the pointer is located within the content display by monitoring an event that indicates that the pointer has entered the area defined by the content display. The monitoring method of the invention can use this information provided by the operating system to count the number of times that the on-screen pointer enters the area defined by the content display. The monitoring method can also determine when the on-screen pointer leaves the defined area after each entry, by monitoring another event that indicates that the pointer has exited the area defined by the content display. The time stamps associated with the entry into and exit from the defined area can be used to calculate the duration of time that the pointer was in the defined area for each entry into the defined area, as well as the total duration of time that the pointer was within the defined area. The monitoring method can also determine when the on-screen pointer is moving within the defined area, again by monitoring an event that indicates such pointer movement. The above-described information regarding the on-screen pointer position and movement relative to the content display may be useful in determining how attentive the observer was to the content, since an observer frequently watches the position of the on-screen pointer when viewing the display screen.

In another embodiment of the invention, the monitoring method monitors the change in time of a characteristic of the content display. The change in time of this characteristic is evaluated to produce monitoring information. The evaluation can be accomplished, for example, by further monitoring the change in time of a characteristic of the computer system used to display the content, and comparing the change in time of the characteristic of the content display to the change in time of the characteristic of the computer system. Either of the two examples given immediately above (hiding of the content display and entry of a pointer into a defined area) are also examples of a monitoring method in accordance with this embodiment of the invention.

A monitoring method according to the invention can obtain a variety of other information, as well. For example, the monitoring method can obtain a time stamp (date and time of day) that indicates when the display of the content began. When the monitoring method is implemented by an applet written in Java, the time stamp can be obtained using a method that exists as part of the Java language.

Identifying information regarding the computer on which the content is displayed can also be obtained. The Internet Protocol (IP) address from which the request for the content was made, as well as an identification of the machine to which the content was transferred can be obtained. (There may not be a one-to-one correspondence between these two if, for example, the latter is a client computer of a system for which the former is a server computer.) Again, both the IP address and machine name can be obtained using a pre-existing Java method.

A monitoring method according to the invention can also determine if the user of the computer at the content display site selected (e.g., clicked with a mouse or pressed an appropriate keyboard key) a hyperlink within the area of the content display to end display of the current content display. Similar to the monitoring of the pointer location described above, an applet that implements a monitoring method of the invention can include a standard Java method (e.g., HandleEvent) that accepts events transmitted by the operating system. One of the events is the selection of a hyperlink. When such an event is reported, the monitoring method can so note.

As previously indicated, the above-described examples of monitoring information are merely illustrative of the types of monitoring information that can be obtained by a monitoring method according to the invention. Generally, a monitoring method according to the invention can make use of any method available in the computing environment, e.g., an operating system method, or a method that is part of a software framework, or that can be written in a computer programming language that can be used in the computing environment. For example, when the monitoring method is implemented by an applet written in Java, any existing Java method can be used to obtain information relevant to the display of the content to be monitored, either by using the method to change the state of the computer (e.g., the state of the display) on which the content is being displayed and monitoring the response of the computer (e.g., the method for monitoring whether content display is hidden, discussed above) or by retrieving information about the state of the computer (e.g., the method for monitoring entry of the pointer into the content display, discussed above). In particular, the monitoring of events as discussed above can be useful in discerning information about the content display.

A monitoring method according to the invention can also be used to ascertain information about an audio display. For example, if the content being monitored includes audio content that can only be displayed by selecting an appropriate user interface mechanism (e.g., a graphical pushbutton), a monitoring method according to the invention can determine whether that "event" is transmitted to the window represented by the content, indicating that the audio display was at least begun. Using a method as described above for determining the duration of a content display, together with knowledge of the when the audio display was begun (using a time stamp as described above), the duration of the audio display can also be determined. It may also be possible to determine the volume at which the audio content is displayed, by appropriately monitoring the methods used to operate the audio display devices. These examples are merely illustrative. As can be appreciated, using any other method available in the computing environment, other information regarding an audio display can be determined.

A monitoring method according to the invention can also be used to explicitly (i.e., by presenting questions to observers that they can answer) acquire demographic information regarding the observers of the content being monitored. This could be implemented, for example, by including the instructions for asking such questions, the content of the questions and the instructions for storing the obtained demographic information in a computer program used to implement the monitoring method. Or, such instructions and question content could be stored in a separate file that is called and executed by the computer program that implements the monitoring method. Or, instructions for presenting the questions and storing the answers could be included as part of the computer program for implementing the monitoring method, and the content of the questions could be contained in a separate file that is accessed by the computer program. These latter two possibilities can be particularly advantageous, since they allow multiple sets of demographic questions to be presented to observers by the monitoring method, thus enabling the demographic questions to be tailored to the content being displayed or to the characteristics of the observer likely to view the content.

As described above, in accordance with the invention, monitoring information regarding the display of content can be obtained, then later reviewed and analyzed to enable conclusions to be drawn about how the content was displayed and, possibly, to enable deductions to be made about how the content was observed. In addition, monitoring information can be used to affect the display of a set of content. One way in which this can occur is for a set of content, or the manner in which the set of content is displayed, to be modified based upon review and analysis of monitoring information obtained from previous displays of the set of content (e.g., monitoring information regarding whether or not the content was hidden, or the frequency of display of the content at different times during the day or week, that may be used to determine the best location on a display screen or the best times, respectively, to display the content).

Another way in which monitoring information can be used to affect the display of a set of content is to use certain monitoring information obtained just before or during the display to cause the set of content to be displayed in a particular manner. For example, as discussed above, the IP address from which a request for a set of content emanated can be ascertained when the request is first received. It may be possible to associate characteristics of an observer or observers with an IP address from which a request for content has been received (because, for example, demographic information has previously been obtained as described above when a set of content was previously transferred to that IP address). Based upon the known characteristics associated with the IP address, an appropriate one of multiple versions of the requested set of content can be transferred for display, e.g., if it is known that the IP address corresponds to a content display site that is used by observers that speak a particular language, then text displayed aurally or visually can be displayed in that language. As another example, the duration of time that a set of content has been displayed can be determined, as discussed above, and the portion of the set of content that is being displayed changed as a function of that duration, e.g. r the display of a set of content can begin with a particular video display and change to another video display after passage of a specified duration of time. As still another example, the portion of a set of content that is displayed can be varied based upon performance characteristics of the network over which the content is transferred. For example, the amount of time required to transfer data from the content provider site to the content display site can be monitored (by, for example, obtaining information from the log file regarding the size of transferred files and the amount of time required to transfer those files, as discussed above). The display of the content can then be controlled so that a moving video is displayed if the data transfer rate is above a predetermined magnitude and a still video is displayed if the data transfer rate is below the predetermined magnitude, the predetermined magnitude being chosen so that data rates below that magnitude are insufficiently fast to produce moving video of acceptable quality. The above examples are merely illustrative; other ways of using monitoring information to affect the display of a set of content are contemplated by the invention.

As described above, a monitoring method according to the invention can obtain monitoring information regarding the display of content. Of particular interest is the basic question of whether the content was displayed at all. As described above, a monitoring method according to the invention can make this determination. Some observers, however, have developed techniques for suppressing the display of particular content (e.g., advertisements). A monitoring method according to the invention can also increase the likelihood that particular content is displayed by conditioning certain other operation of the computer system that displays the content on the display of that particular content. For example, the content to be monitored can be presented as part of other content. Such presentation is common on, for example, the World Wide Web, where, for example, advertising content is frequently included as part of other content. A monitoring method according to the invention can condition the display of the other content on the display of the to-be-monitored content, e.g., the full content of a Web page cannot be viewed unless an advertisement included on the Web page is viewed. Moreover, the presentation of the other content can be conditioned on the display of the to-be-monitored content for a specified period of time. This can be particularly valuable when the to-be-monitored content does not appear automatically as part of the other content, but, rather, is only displayed in response to selection of an appropriate user interface mechanism (e.g., a graphical pushbutton) that is part of the other content.

In accordance with the above-described forced presentation of specified content, the detection of content suppression can be accomplished in any suitable manner. For example, it may be possible to detect the suppression technique being used. Or, the display of the content can be ordered so that the content that must be displayed ("required content") is displayed first; if the monitoring method detects that the content display site is displaying the other content without first having displayed the required, then suppression of the required content has been detected. Upon detection of suppression of the required content, display of the other content is prevented and, if desired, a message indicating that fact can be displayed.

As indicated above, after monitoring information is obtained by a monitoring method according to the invention, the monitoring information is transferred from the content display site 302 to a remote site. The remote site can be the content provider site 301 or another site that is part of the network. When a monitoring method according to the invention is implemented by a Java applet, the remote site is the content provider site 301, since, currently, such applets can only communicate information to the network site from which they were transferred. However, in the future, such constraint may not exist; in that event, the remote site need not necessarily be the content provider site 301 even when a Java applet is used to implement a monitoring method according to the invention.

Generally, the monitoring information can be transferred to the remote site at any time. It may be desirable, for example, to cause the monitoring information to be transferred to the remote site immediately after the monitoring information is obtained, so that the monitoring information is accessible as quickly as possible. It may, alternatively, be desirable to store the monitoring information at the content display site, then transfer the monitoring information at a time when communication over the network communication line 303 is fastest and/or least expensive, e.g., at night.

The monitoring information can be communicated to a communication port that is different than the port from which the content and the monitoring instructions were transmitted to q the content display site 302. In that event, a special daemon that monitors such communication port for receipt of monitoring information is installed on the server computer at the content provider site. The daemon can be implemented as a conventional server daemon for monitoring data received by a server computer on a designated communication port. Communication of the monitoring information to a specially designated port can be useful to enable the monitoring data to sent in any desired format in accordance with any desired protocol. For example, the monitoring data can be encrypted, as described below.

When the invention is implemented with the World Wide Web, it is also possible to transmit the monitoring data over the network using the communication channel monitored by the http daemon, i.e., by transmitting a request to the http daemon. Such transmission may be desirable for several reasons. For example, transmission of monitoring data to the http daemon eliminates the need to create, and supply to operators of the remote site to which the monitoring data is to be transferred (e.g., a Web page operator or, as described below, an application manager site operator), special software for receiving the monitoring data. Additionally, transmission of monitoring data by transmitting a request to the http daemon may be the only way to transfer the monitoring data to the remote site. This can be true, for example, when one or more client computers are served by a "proxy server" which mediates communication between the client computers and other sites on the network. The proxy server may not allow communication over a channel specially designated for transmitting monitoring data, but allow communication to the http daemon.

Transmission of monitoring data by making a request to the http daemon can be accomplished in a variety of ways. For example, an http request can be submitted for a file having a "name" that denotes the monitoring data in some way. Notwithstanding the spurious nature of the file request, the request is recorded in the http log file, from which the "name" can be retrieved to enable extraction of the monitoring data. Or, a request for execution of a CGI script can be transmitted, with the parameter of the CGI script request that specifies input to the script being specified to denote the monitoring data in some way. A computer program resident on the computer system at the remote site can then implement a method that extracts the value of the input from the CGI script, and the monitoring data can be extracted from the value of the input. Other methods of using CGI scripts or http requests to transmit monitoring data to an http daemon are possible.

For security, it may be desirable to encrypt the monitoring data before it is transferred from the content display site 302 to a remote site. Any suitable encryption method can be used. For example, a public key encryption method, such as the well known RSA algorithm, can be used to encrypt the monitoring data. In general, the monitoring data (or other data transferred over a network in accordance with the invention) can be encrypted before any transmission of the data over a network (other examples of such data transmission are described below as part of the systems illustrated in FIGS. 5A, 5B and 5C, and FIGS. 6A, 6B, 6C and 6D).

Once communicated to the remote site, the monitoring information can be stored in any appropriate database, as known to those skilled in the art of constructing and managing databases. The monitoring information can be presented for observation through a suitable user interface, such as a graphical user interface (GUI), in any desired format, e.g., graphs, bar charts, pie charts. The monitoring information stored in the database can also be subjected to further analysis if desired. For example, the total time that a content display is available to be viewed can be broken down into percentages of time that the content display was unobstructed, partially hidden and fully hidden. Or, the percentage of observers of a set of content that select a particular hyperlink while observing the content can be identified.

The monitoring information may be of interest not only to the content provider that provides the content for display, but to third parties as well. For example, if the content provided by the content provider includes an advertisement, the advertiser may be interested in the monitoring information regarding display of the content. The third party and the content provider may have conflicting interests in the substance of the monitoring information. For example, if the third party is paying the content provider to include the third party's content with the content provider's content, and the payment is based upon the amount of exposure of the third party's content to observers, the content provider has an interest in the monitoring information showing a large amount of exposure of the content, while the third party has an interest in the monitoring information showing a small amount of exposure. (Both parties, of course, can be simultaneously motivated by other interests, as well: for example, the third party may simply want the monitoring information to reflect accurately the amount of exposure of the content, so that they can use that information in assessing the effects of providing their content through the content provider.) If the monitoring information is transferred from the content display site to the content provider site, and unrestricted access to the monitoring information allowed at the content provider site, there may be no foolproof way to prevent the content provider from tampering with the substance of the monitoring information. This problem is particularly acute when a monitoring method according to the invention is embodied in a manner (e.g., by a Java applet), as discussed above, that necessitates that the monitoring information be transferred back to the content provider site.

Figure 5A:
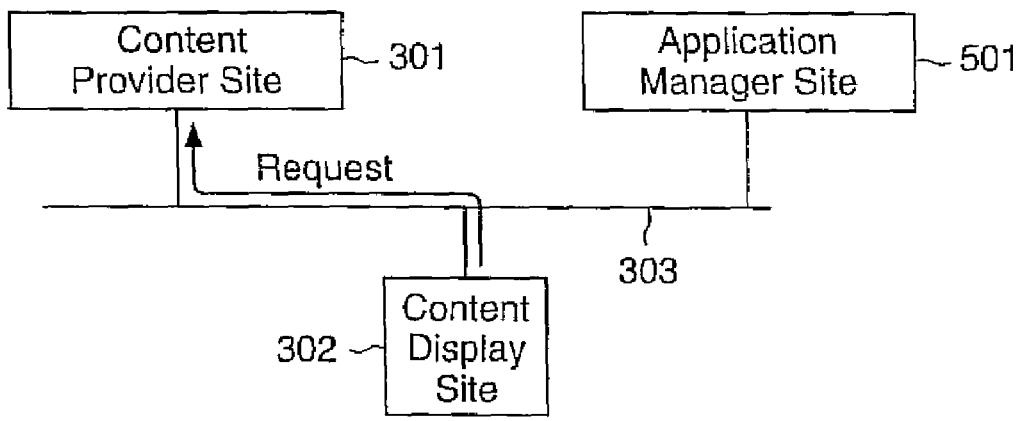
FIGS. 5A, 5B and 5C are simplified diagrams of a network illustrating operation of another embodiment of the invention.
Figure 5B:
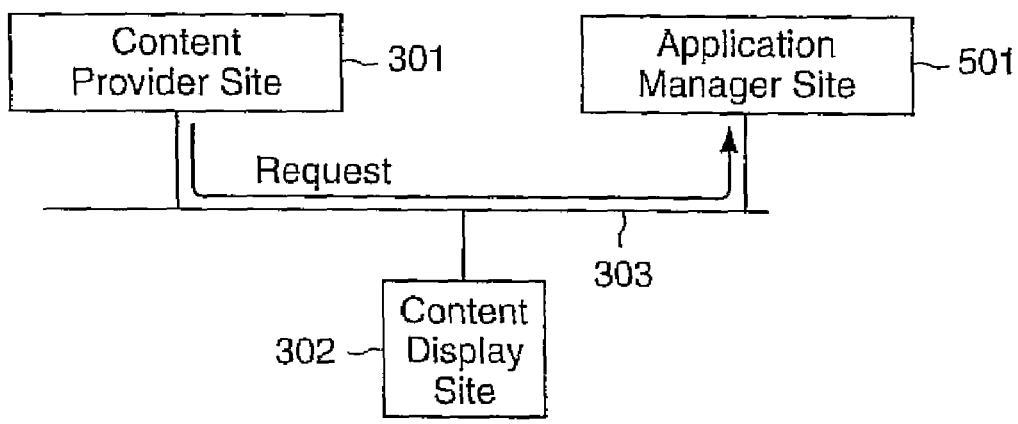
Figure 5C:
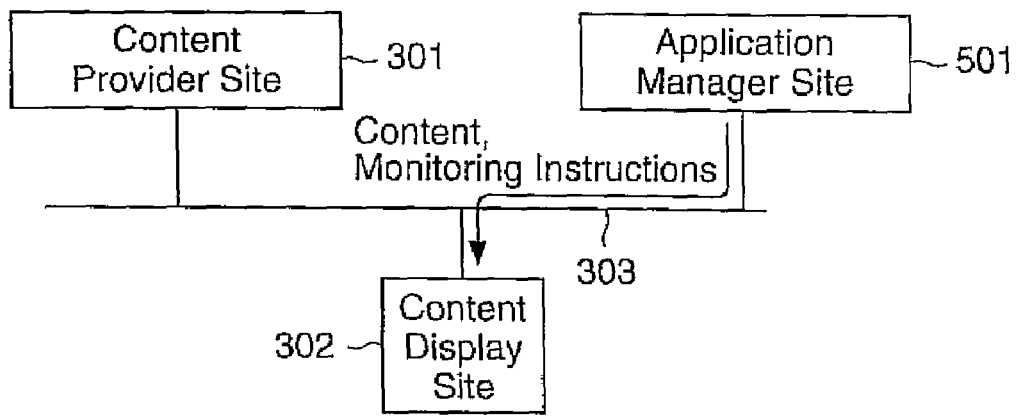

FIGS. 5A, 5B and 5C are simplified diagrams of a network illustrating operation of another embodiment of the invention. This embodiment of the invention provides a system configuration that can overcome the problem of possible tampering with the substance of the monitoring information by the content provider. As in the system illustrated in FIGS. 3A, 3B and 3C, a content display site 302 is linked over a network to a content provider site 301. The network also includes an application manager site 501. The content display site 302 and content provider site 301 can communicate with each other via the network communication line 303, as described above, to enable transfer of content and monitoring instructions from the content provider site 301 to the content display site 302. Alternatively, the content and monitoring instructions can be transferred to the content display site 302 from the application manager site 501 in response to a request received from the content provider site 301 upon receipt of the request from the content display site 302. This latter implementation is illustrated in FIGS. 5A, 5B and 5C. In such an implementation, the content provider site 301 needn't have either a computer program for implementing the monitoring method or a program for receiving monitoring data installed at the content provider site 301, thus simplifying use of the invention for the content provider. Rather, the content provider need only have an open account (as discussed below) at the application manager site 501.

In this embodiment of the invention, the monitoring information obtained at the content display site 302 is transferred to the application manager site 501, either directly from the content display site 302 or indirectly via the content provider site 301. If the latter, then the monitoring information can be received by the content provider site 301 and transferred to the application manager site 501 in a way that prevents access to the monitoring information at the content provider site 301. For example, the monitoring information could be encrypted at the content display site 302 before transfer to the content provider site 301, the decryption method being available only at the application manager site 501. Or, the monitoring information could be immediately transferred to the application manager site 501 after being received at the content provider site 301. Once received at the application manager site 501, access to the monitoring information can be administered by the (neutral) application manager so that the monitoring information can not be modified by any of the parties having an interest in the information, thus ensuring the integrity of the monitoring information.

In a typical implementation, multiple sets of content will be provided from multiple content provider sites, and each set of content will be displayed by multiple content display sites. A set of monitoring information will be recorded for each display of each of the multiple sets of content and transferred to the application manager site for storage in a database that is implemented on a computer at the application manager site. Each set of monitoring information must be identified as corresponding to the set of content for which the monitoring information was obtained, so that monitoring information can be appropriately stored in a database to enable later retrieval of the monitoring information for that set of content. When a monitoring method according to the invention is implemented for use with the World Wide Web, this can be accomplished by appropriate specification of a parameter included in a computer program written in html used to implement a monitoring method, as discussed above. Example 3 below illustrates how Example 1 discussed above can be modified to make such specification (the "Account" parameter).

EXAMPLE 3

```
<applet code="//AppMgr.com/AdInsert.class" width=230 height=33>
<param name="image" value="images/southwest.gif">
<param name="href" value="http://www.swa.com/">
<param name="Account" value="9004560093">
</applet>
```

The database residing on the computer at the application manager site can also be used, for example, to store account information about the content provider site from which the content display is provided.

In the embodiment of the invention illustrated in FIG. 5, a user interface (e.g., GUI) can be provided on the content provider site computer to enable the owner (or representative) of the content provider site to access monitoring information stored at the application manager site regarding content displays provided by the content provider site. Such an interface can also be configured to enable the content provider to create a new account on the application manager computer, authorize payments for use of the monitoring system of the invention, and request particular analysis or presentation of obtained monitoring information. Other functions can also be provided in such an interface, as desirable.

It is also possible that there be multiple application manager sites. Typically, monitoring information for each content display will be designated for storage on a particular one of the application manager sites. Such designation can be included as a parameter specification in a computer program used to implement the monitoring information as discussed above.

As discussed above, the content provided by a content provider can be tailored according to any specified criteria. Further, the content provider may periodically update the content. Additionally, third parties may want to provide their content with that of a content provider. These third parties may also have multiple sets of specially tailored content that are updated periodically. The management of such multiple sets of content by a content provider at the content provider site can become undesirably complex and may overtax the available bandwidth for transmission of data to and from the content provider site.

Figure 6A:
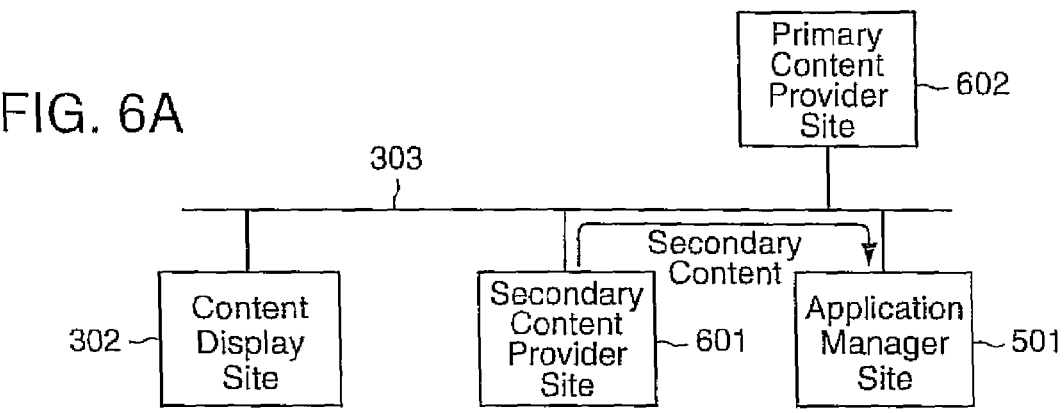
FIGS. 6A, 6B, 6C and 6D are simplified diagrams of a network illustrating operation of still another embodiment of the invention.
Figure 6B:
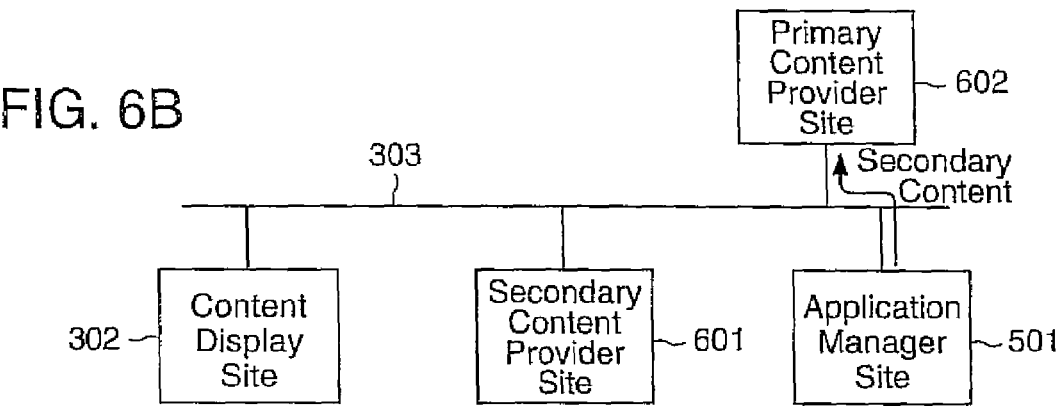
Figure 6C:
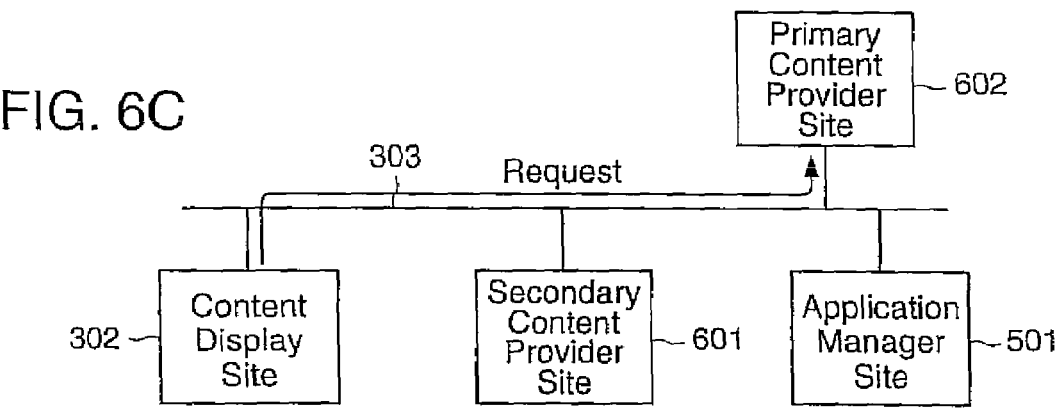
Figure 6D:
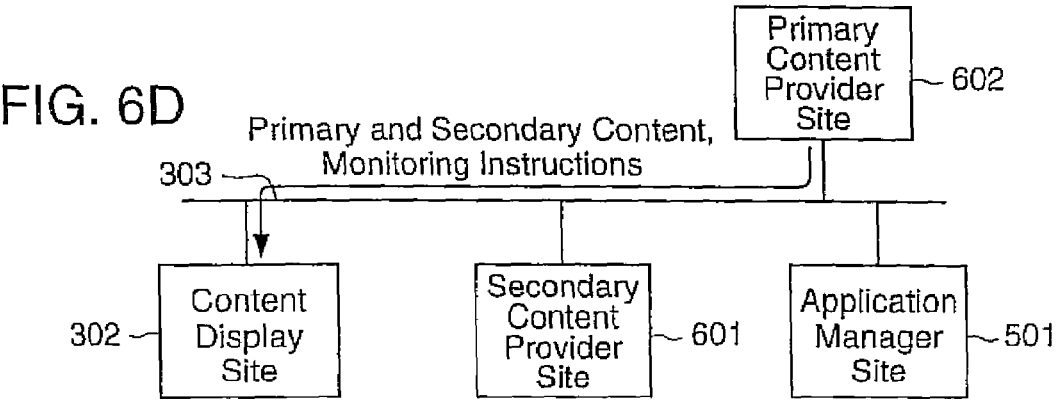

FIGS. 6A, 6B, 5C and 6D are simplified diagrams of a network illustrating operation of still another embodiment of the invention. This embodiment of the invention provides a system configuration that can enable updated and/or tailored secondary content provided by a secondary content provider to be transferred to a primary content display site for use with primary content supplied by a primary content provider without the problems identified above with existing such systems, as discussed in more detail below. This embodiment of the invention also can enable all of the functionality described above for the system illustrated in FIGS. 5A, 5B and 5C. In the embodiment of the invention shown in FIGS. 6A, 6B, 6C and 6D, a content display site 302, a primary content provider site 602 and an application manager site 501 are linked to each other over a network and can communicate with each other as described above. The network also includes a secondary content provider site 601. As shown in FIG. 6A, in this embodiment of the invention, secondary content can be provided from the secondary content provider site 601 to the application manager site 501 and stored thereat. As shown in FIG. 6B, whenever secondary content is provided to the application manager site 501, the application manager causes the content to both be stored at the application manager site 501 and transferred to all content provider sites, e.g., content provider site 602, that provide that secondary content with their primary content. When a request for the primary content that includes such secondary content is received by the primary content provider site 602 from the content display site 302 (FIG. 6C), the primary content provider site 602 is able to immediately (i.e., without necessity to retrieve the content from another network site or request that the content be provided to the content display site from another network site) provide both the primary and secondary content to the content display site 302, as shown in FIG. 6D.

As can be appreciated, the management of both primary and secondary content can become quite burdensome when many sets, and/or many versions of sets, of secondary content and/or primary content are being provided from the primary content provider site. Management of continual updates to these sets of content data exacerbates this burden. By storing secondary content (and, if desired, primary content) at the application manager site 501, the system of FIGS. 6A, 6B, 6C and 6D relieves the primary content provider of the burden of managing such content. However, because the application manager causes the content to be stored at the content provider site 602, the content can be provided to the content display site 302 from the content provider site 602, rather than the application manager site 501, thus leaving control of bandwidth management with the primary content provider so that the primary content provider can ensure that a system that adequately addresses the bandwidth requirements of the content provided from the primary content provider site 602 is in place. This is an important consideration for the primary content provider since requesters of content from the primary content provider will hold the primary content provider responsible for the performance characteristics (e.g., speed) associated with the provision of that content. The system of FIGS. 6A, 6B, 6C and 6D, then, relieves the primary content provider of the need to manage the storage of content, while reserving control over the provision of that content to the content provider.

In this embodiment of the invention a user interface (e.g., GUI) can be provided at both the primary content provider site 602 and the application manager site 501. The primary content provider user interface can provide the same functionality as described above with respect to FIG. 5. Additionally, the primary content provider user interface can enable the content provider to select available secondary content for possible inclusion with that content provider's primary content. Such selection can also include specification of terms upon which the primary content provider wishes to include the secondary content. Selection of secondary content does not automatically cause the secondary content to be included with the primary content provider's content, but, rather, causes a request for such inclusion to be made (e.g., via the secondary content provider user interface, described below) to the secondary content provider. Upon acceptance by the secondary content provider, the secondary content can be included with the primary content. The secondary content provider user interface can enable the secondary content provider to select a primary content provider site with which to include the secondary content provider's content. Again, such selection can be made together with specification of the terms of such inclusion; the selection causes a request for inclusion to be made (e.g., via the primary content provider user interface) to the primary content provider. The secondary content user interface can also provide functionality similar to that described above with respect to FIG. 5. As will be readily appreciated by those skilled in the art, other functions can also be provided in the primary content provider and secondary content provider user interfaces, as desirable. The embodiment of the invention shown in FIG. 6 facilitates interaction between the primary content provider site 602 and the secondary content provider site 601 to enable a secondary content provider to easily and flexibly provide content to a primary content provider in a manner that enables both the primary and secondary content providers to exercise control over the provision of content.

As described above, monitoring instructions and content can be embodied by an applet that executes at the content display site. In the system of FIGS. 5A, 5B and 5C or the system of FIGS. 6A, 6B, 6C and 6D, the use of such an applet can advantageously dovetail with an implementation of those systems in which the applet is transferred to the content display site from the application manager site. This is because an applet must return the monitoring information to the network site from which the applet was transferred: thus, the monitoring information is transferred directly to the neutral application manager site. Too, when the monitoring instructions and content are transferred from the application manager site to the content display site, the use of monitoring information to tailor the content provided to the content display site, as discussed above, can also be easily implemented.

Various embodiments of the invention have been described. The descriptions are intended to be illustrative, not limitative. Thus, it will be apparent to one skilled in the art that certain modifications may be made to the invention as described above without departing from the scope of the claims set out below. For example, though the invention has been described above as it particularly applies to monitoring the display of content disseminated over the World Wide Web, the invention can generally be used to monitor the display of content disseminated over any computer network. Additionally, though an implementation of the invention has been described in which aspects of the Java programming language are used, it is to be understood that invention is not limited to such implementation; other programming languages could be used having other features and characteristics (e.g., the language need not be an object-oriented language as is Java).

I claim:

1. A method of monitoring display of content on a computer comprising:
  receiving a content file from a content provider site at a content display site, the content file having embedded therein at least one computer executable monitoring instruction;
  accessing the content file at the content display site to cause display of the content and execution of the at least one embedded computer executable monitoring instruction to cause a change in a state of the computer;
  monitoring a response of the computer to the change in state to produce monitoring information regarding display of the content on the computer;
  evaluating the monitoring information to determine whether the content is displayed or at least partially hidden; and
  transmitting the monitoring information to a remote site which did not transfer the content file from the content provider site to the content display site and which is different from the content provider site.

2. A method as defined in claim 1, wherein evaluating the monitoring information to determine whether the content is displayed or at least partially hidden comprises evaluating the monitoring information to determine whether the content is displayed, fully hidden, or partially hidden.

3. A method as defined in claim 1, wherein execution of the at least one embedded computer executable monitoring instruction to cause the change in a state of the computer comprises invalidating at least a portion of a monitored image by requesting redrawing of the at least a portion of the monitored image.

4. A method as defined in claim 3, wherein invalidating at least the portion of the monitored image comprises invalidating the at least the portion of the monitored image on a section-by-section basis.

5. A method as defined in claim 4, wherein each of the sections is a pixel.

6. A method as defined in claim 5, wherein invalidating at least the portion of the monitored image comprises invalidating multiple portions of the monitored image.

7. A method as defined in claim 6, wherein the multiple portions comprise the corners of the image.

8. A method as defined in claim 7, wherein if none of the corners are redrawn, the image is identified as hidden.

9. A method as defined in claim 7, wherein if none of the corners are redrawn, the image is identified as fully hidden.

10. A method as defined in claim 7, wherein if all of the corners are redrawn, the image is identified as unobstructed.

11. A method as defined in claim 7, wherein if at least one of the corners is redrawn, the image is identified as partially hidden.

12. A method as defined in claim 7, wherein the multiple portions further comprise at least one of a center portion of the image or an edge portion of the image.

13. A method as defined in claim 1, generating a timestamp if the content is at least partially hidden.

14. A method u defined in claim 1, generating a timestamp if the content is not hidden.

* * * * *